(12) United States Patent
McCusker

(10) Patent No.: US 9,189,962 B1
(45) Date of Patent: Nov. 17, 2015

(54) SYSTEM AND METHODS FOR GENERATING ALERT SIGNALS IN A TERRAIN AWARENESS AND WARNING SYSTEM

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2054 days.

(21) Appl. No.: 11/904,492

(22) Filed: Sep. 27, 2007

(51) Int. Cl.
| | |
|---|---|
| G01C 5/00 | (2006.01) |
| G08B 23/00 | (2006.01) |
| G08G 5/00 | (2006.01) |
| G01C 23/00 | (2006.01) |
| G05D 1/06 | (2006.01) |

(52) U.S. Cl.
CPC .................... G08G 5/0086 (2013.01)

(58) Field of Classification Search
CPC .......... G01C 23/00; G01C 5/00; G01C 5/005; G01S 19/15; G05D 1/0646; G08G 5/0021; G08G 5/006; G08G 5/0078; G08G 5/0086; G08G 5/04
USPC ................. 340/963, 970; 701/3, 4, 5, 8, 9, 14
See application file for complete search history.

(56) References Cited

U.S. PATENT DOCUMENTS

| | | | |
|---|---|---|---|
| 4,914,436 A | | 4/1990 | Bateman et al. |
| 5,839,080 A | | 11/1998 | Muller et al. |
| 6,092,009 A | | 7/2000 | Glover |
| 6,122,570 A | | 9/2000 | Muller et al. |
| 6,138,060 A | | 10/2000 | Conner et al. |
| 6,219,592 B1 | | 4/2001 | Muller et al. |
| 6,980,892 B1 | * | 12/2005 | Chen et al. ........................ 701/9 |
| 7,145,501 B1 | | 12/2006 | Manfred et al. |
| 7,714,744 B1 | * | 5/2010 | Wichgers ..................... 340/965 |
| 7,881,867 B2 | * | 2/2011 | Lorido et al. .................. 701/301 |
| 7,908,045 B1 | * | 3/2011 | McCusker ........................ 701/9 |
| 8,019,491 B1 | * | 9/2011 | McCusker ........................ 701/4 |
| 8,234,020 B1 | * | 7/2012 | Wichgers et al. .................. 701/9 |
| 2006/0097895 A1 | * | 5/2006 | Reynolds et al. ............. 340/961 |
| 2006/0290531 A1 | * | 12/2006 | Reynolds et al. ............. 340/961 |
| 2007/0250223 A1 | * | 10/2007 | Francois et al. ................... 701/9 |

OTHER PUBLICATIONS

Technical Standard Order (TSO)-C151b, Terrain Awareness and Warning System. Washington, DC: Federal Aviation Administration, 2002. Print.*
Spitzer, Cary R. The Avionics Handbook. 2nd ed. vol. 2. CRC Press, 2001. Chapter 17. eBook. ISBN 9780849383489.*
Technical Standard Order (TSO)-C92c, Airborne Ground Proximity Warning Equipment, Washington, D.C.: Federal Aviation Administration, 1996.
RTCA DO-161A, Minimum Performance Standards—Airborne Ground Proximity Warning Equipment, Washington, D.C.: Radio Technical Commission for Aeronautics, 1976.

* cited by examiner

Primary Examiner — Khoi Tran
Assistant Examiner — Dale Moyer
(74) Attorney, Agent, or Firm — Angel N. Gerdzhikov; Donna P. Suchy; Daniel M. Barbieri

(57) ABSTRACT

Novel and non-trivial systems and methods for generating and providing alerts in a terrain awareness and warning system ("TAWS") are disclosed. The systems could be comprised of a navigation system, an airport-related database, a terrain database, a terrain alert processor, and crew alerting system. A phase of flight and flight attitude parameter may be determined based on the location to the nearest airport or runway environment, and a terrain clearance altitude associated with the phase of flight and flight attitude parameter may be added to the highest elevation of a terrain cell over which the aircraft is projected to operate to determine a minimum operating altitude of the terrain cell. If the aircraft altitude is less than any value of minimum operating altitude along the projected flight path, an alert signal is generated.

34 Claims, 12 Drawing Sheets

SYSTEM AND METHODS FOR GENERATING ALERT SIGNALS IN A TERRAIN AWARENESS AND WARNING SYSTEM

BACKGROUND OF THE INVENTION

1. Field of the Invention

This invention pertains to the field of terrain awareness and warning systems employed in aircraft.

2. Description of the Related Art

Beginning in the early 1970's, a number of studies looked at the occurrence of "controlled flight into terrain" (CFIT)-type accidents, where a properly functioning airplane under the control of a fully qualified and certificated crew is flown into terrain (or water or obstacles) with no apparent awareness on the part of the crew. Findings from these studies indicated that many such accidents could have been avoided if a warning device called a ground proximity warning system ("GPWS") was used. There have been numerous patents issued in the field of GPWS and related art. A sampling of patents issued in the art and related art include U.S. Pat. Nos. 5,839,080; 6,092,009; 6,122,570; 6,138,060; 6,219,592; and 7,145,501.

Advances in technology have permitted vendors and designers of avionics equipment to develop newer type of GPWS that provides greater situational awareness for flight crews. The U.S. Federal Aviation Administration ("FAA") has classified such systems as Terrain Awareness and Warning Systems ("TAWS"). The advancement of technologies—more precise navigation systems, increased computer memory storage, and better display technology—have allowed further development of in the common features of TAWS: (1) use of airplane position information from the aircraft's navigation system(s), (2) an onboard terrain database, and (3) a means of displaying the surrounding terrain. Aircraft position information from the aircraft's navigation system is fed to a TAWS computer. The TAWS computer compares the airplane's current position and flight path with the terrain database associated with the system. If there is a potential threat of collision with terrain, the TAWS computer sends warning alerts to the airplane's audio system.

There are scenarios for which TAWS has been implemented. These scenarios may be categorized by the flight operations in which aircraft accidents have occurred: departure operations, enroute operations, and arrival operations. First, departure operations could include accidents in which the aircraft does not climb fast enough to clear a terrain cell of interest and in which a pilot has leveled off before the aircraft has achieved the appropriate altitude to clear the terrain. Second, enroute operations could include accidents associated with level flight into terrain and descending flight into terrain. Third, arrival operations could include accidents associated with premature descents and late level-offs in a step down arrival procedure. The embodiments disclosed herein present novel and non-trivial systems and methods which address these scenarios by generating an alert signal as a function of a phase of flight and flight attitude parameter and a required terrain clearance altitude associated with such parameter.

BRIEF SUMMARY OF THE INVENTION

The embodiments disclosed herein present novel and non-trivial systems and methods for generating and providing alerts in TAWS. Minimum performance standards for equipment used in a TAWS may include providing required terrain clearance altitudes ("required TCA") based upon (1) a phase of flight (e.g., enroute, terminal, approach, and departure) and (2) flight attitude (level, descent, and climb). The phase of flight may depend on the aircraft's current position, altitude, and distance with respect to a nearest airport, runway, and runway threshold and heights above terrain (or terrain elevation). Phase of flight and flight attitude may be determined by a terrain alert processor using navigation sources for providing navigation data (e.g., data representative of aircraft position, altitude, and attitude) and airport-related data sources for providing airport information (e.g., navigation databases). Once a required TCA has been determined, this parameter may be applied to the highest elevation of a terrain cell of the aircraft's current position and projected positions to obtain a minimum operating altitude for that particular terrain cell. Alerts may be generated based on comparing the aircraft altitude and the minimum operating altitude for that phase of flight and flight attitude.

In one embodiment, a system for generating an alert signal in a terrain awareness and warning system is disclosed. The system could be comprised of a navigation system, an airport-related database, a terrain database, a terrain alert processor, and crew alerting system, wherein the terrain database is populated with elevation data of terrain cells. The terrain alert processor could determine a minimum operating value based upon input comprising of a required TCA for the phase of flight and flight attitude. The terrain alert processor could generate an alert signal if the aircraft altitude is equal to or less than a value of a minimum operating altitude and provide the alert signal to the crew alerting system. In another embodiment, the terrain alert processor could generate an alert signal if the aircraft altitude is equal to or less than a value of a minimum descent altitude and provide the alert signal to the crew alerting system. In another embodiment, the terrain alert processor could generate an alert signal if the aircraft altitude is equal to or less than a value of a descent caution altitude and provide the alert signal to the crew alerting system. In another embodiment, the terrain alert processor could generate an alert signal if the aircraft altitude is equal to or less than a value of a descent warning altitude and provide the alert signal to the crew alerting system. In another embodiment, the terrain alert processor could generate an alert signal if the aircraft altitude is equal to or less than a value of a minimum ascent altitude and provide the alert signal to the crew alerting system. In another embodiment, the terrain alert processor could generate an alert signal if the aircraft altitude is equal to or less than a value of an ascent caution altitude and provide the alert signal to the crew alerting system. In another embodiment, the terrain alert processor could generate an alert signal if the aircraft altitude is equal to or less than a value of a minimum ascent altitude and provide the alert signal to the crew alerting system.

In another embodiment, a second system for generating an alert signal in a terrain awareness and warning system is disclosed. The system could be comprised of a navigation system, an airport-related database, a terrain database, a terrain alert processor, and crew alerting system, wherein the terrain database is populated with minimum operating altitude data of terrain cells based upon a phase of flight and flight parameter. The terrain alert processor could generate and provide the alert signals as discussed in the preceding paragraph based on the retrieval of minimum operating altitude data from a terrain database.

In another embodiment, a third system for generating an alert signal in a terrain awareness and warning system is enclosed. The system could be comprised of a navigation system, an airport-related database, a terrain database, a terrain alert processor, and crew alerting system, wherein the terrain database is populated with minimum operating radio altitude data of terrain cells based upon a phase of flight and flight parameter. The terrain alert processor could generate an alert signal if the aircraft radio altitude is equal to or less than a value of a minimum operating radio altitude and provide the alert signal to the crew alerting system. In another embodiment, the terrain alert processor could generate an alert signal if the aircraft radio altitude is equal to or less than a value of a minimum descent radio altitude and provide the alert signal to the crew alerting system. In another embodiment, the terrain alert processor could generate an alert signal if the aircraft radio altitude is equal to or less than a value of a descent caution radio altitude and provide the alert signal to the crew alerting system. In another embodiment, the terrain alert processor could generate an alert signal if the aircraft radio altitude is equal to or less than a value of a descent warning radio altitude and provide the alert signal to the crew alerting system.

In another embodiment, a method for generating an alert signal in a terrain awareness and warning system is enclosed. A value of minimum operating altitude could be determined based on the required TCA and the value of the highest elevation of a terrain cell stored in the terrain database. A comparison could be made by the terrain alert processor, and if the aircraft altitude is equal to or less than the minimum operating altitude, then an alert signal could be generated and provided to a crew alerting system. In another embodiment, an alert signal could be generated if the aircraft altitude is equal to or less than a value of a minimum descent altitude and provided the alert signal to the crew alerting system. In another embodiment, an alert signal could be generated if the aircraft altitude is equal to or less than a value of a descent caution altitude and provided the alert signal to the crew alerting system. In another embodiment, an alert signal could be generated if the aircraft altitude is equal to or less than a value of a descent warning altitude and provided the alert signal to the crew alerting system. In another embodiment, an alert signal could be generated if the aircraft altitude is equal to or less than a value of a minimum ascent altitude and provided the alert signal to the crew alerting system. In another embodiment, an alert signal could be generated if the aircraft altitude is equal to or less than a value of an ascent caution altitude and provided the alert signal to the crew alerting system. In another embodiment, an alert signal could be generated if the aircraft altitude is equal to or less than a value of a minimum ascent altitude and provided the alert signal to the crew alerting system.

In another embodiment, a second method for generating an alert signal in a terrain awareness and warning system is enclosed. A value of minimum operating altitude could be retrieved from the terrain database. The alert signals discussed in the preceding paragraph could be generated and provided to the crew alerting system after retrieval of minimum operating altitude data from a terrain database.

In another embodiment, a third method for generating an alert signal in a terrain awareness and warning system is enclosed. A value of minimum operating radio altitude could be retrieved from the terrain database. An alert signal could be generated if the aircraft radio altitude is equal to or less than a value of a minimum operating radio altitude, and provided the alert signal to the crew alerting system. In another embodiment, an alert signal could be generated if the aircraft radio altitude is equal to or less than a value of a minimum descent radio altitude, and provided the alert signal to the crew alerting system.

In another embodiment, an alert signal could be generated if the aircraft radio altitude is equal to or less than a value of a descent caution radio altitude, and provided the alert signal to the crew alerting system. In another embodiment, an alert signal could be generated if the aircraft radio altitude is equal to or less than a value of a descent warning radio altitude, and provided the alert signal to the crew alerting system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
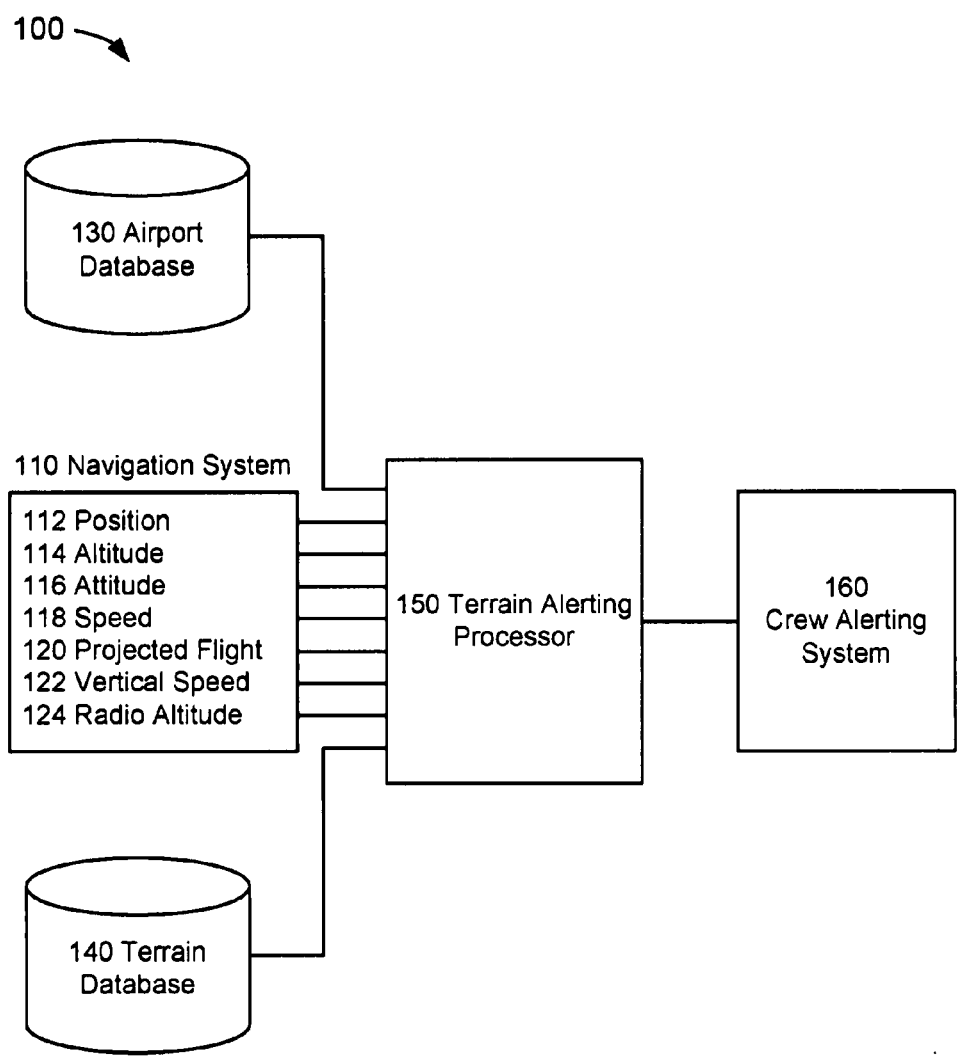
FIG. 1 depicts a block diagram of a system for generating an alert signal in a terrain-awareness and warning system

FIG. 1 depicts a forward looking terrain avoidance system 100 suitable for implementation of the techniques described herein. The system may be comprised of a navigation system 110, an airport database 130, a terrain database 140, a terrain alerting processor 150, and a crew alerting system 160.

A navigation system 110 includes those systems that provide navigation data information to the pilot. A navigation system 110 may include, but is not limited to an air/data system, attitude heading reference system, an inertial guidance system (or inertial reference system), global navigation satellite system (or satellite navigation system), and flight management computing system, of all which are known to those skilled in the art. For the purposes of the embodiments herein, a radio altimeter system may be included in the navigation system 110; a radio altimeter system is known to those skilled in the art for presenting radio altitude information to the pilot indicating, i.e., the altitude above the terrain over which the aircraft is currently operating. As embodied herein, a navigation system 110 could provide navigation data including, but not limited to, aircraft position 112, altitude 114, attitude 116, speed 118, projected flight path 120, vertical speed 122, and radio altitude 124 to a terrain alerting processor 150 for subsequent processing as discussed herein.

Navigation data may be used, in part, to identify a phase of flight of an aircraft in flight and flight attitude, two parameters which may be used to define minimum terrain clearance standards in a terrain awareness and warning system. Such navigation data may be used, in part, to identify a phase of flight and flight attitude.

An airport database 130 may be used to store airport-related data including, but not limited to, airport and runway information. Airport information could include surveyed location and elevation data, and runway information could include surveyed location and elevation data of the runway and runway threshold. Airport-related data may be used, in part, to identify a phase of flight of an aircraft in flight, a parameter which may be used to define minimum terrain clearance standards in a terrain awareness and warning system. An example of a database which may provide a source of airport-related data as embodied herein may be a navigation database included as part of a flight management computing system. As embodied herein, an airport database 130 could provide airport-related data to a terrain alerting processor 150 for subsequent processing as discussed herein.

A terrain database 140 may be used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a square cell defined in arc-minutes of latitude and longitude, or a grid may be circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set by an approximately ratio of 900:1. At the present time, resolutions of one-arc second for SRTM terrain data are available for areas over the United States; for all other locations, resolutions of three arc-seconds (approx. 90 meters) are available. In addition to these public sources of terrain data, various vendors and designers of avionics equipment have developed databases that have been, for all intents and purposes, proprietary in nature.

Typically, data contained in a terrain data cell may include the value of the highest elevation found within the cell. In an embodiment herein, a terrain database 140 could have a plurality of terrain cells, each having a value of the highest elevation found within the cell. In an alternative embodiment, data contained in a terrain data cell could be a minimum operating altitude which could be the sum of the highest elevation found within the terrain cell and a required terrain clearance altitude specified in a terrain awareness and warning system, where the minimum operating altitude may depend upon a phase of flight (e.g., enroute, terminal, approach, and departure) and flight attitudes (e.g., level, descent, and climb). If terrain data is comprised of minimum operating altitudes, then terrain database 140 could store a minimum operating altitude per phase of flight and flight altitude in one embodiment. In another embodiment, a terrain database 140 may be comprised of one or more databases where each database stored one or more minimum operating altitudes corresponding to specific phases of flight and flight attitudes.

A terrain alerting processor 150 may receive input data from various systems including, but not limited to, a navigation system 110, an airport database 130, and a terrain database 140 for processing as discussed herein. A terrain alerting processor 150 may also generate output data or signals to various systems including, but not limited to, a crew alerting system 160. For example, a terrain alerting processor 150 may provide one or more alerts signals to a crew alerting system 160 for providing aural and visual alerts to the pilot as discussed herein.

A terrain alerting processor 150 may receive input data from various systems including, but not limited to, a navigation system 110, an airport database 130, a terrain database 140 for processing as discussed herein. A terrain alerting processor 150 may be electronically coupled to a navigation system 110, an airport database 130, a terrain database 140 to facilitate the receipt of input data. It is not necessary that a direct connection be made; instead, such receipt of input data could be provided through a data bus or through a wireless network.

A terrain alerting processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A terrain alerting processor 150 may be driven by the execution of software or source code containing algorithms developed for the specific functions embodied herein. Common examples of an electronic data processing unit include microprocessors and signal processors; however, for the embodiments herein, the term processor is not limited to the microprocessor and its meaning is not intended to be construed narrowly. For instance, a terrain alerting processor 150 could also consist of more than one electronic data processing units.

A crew alerting system 160 includes those systems that provide, in part, aural and visual alerts to the pilot, alerts that could be visual, aural, or tactile stimulus presented to attract attention and convey information regarding system status or condition. A crew alerting system 160 may include, but is not limited to, an aural alert unit for producing aural alerts and a display unit for producing visual alerts. Aural alerts may be discrete sounds, tones, or verbal statements used to annunciate a condition, situation, or event. Visual alerts may be the use of projected or displayed information to present a present a condition, situation, or event to the pilot on a cockpit display unit. In addition, alerts may be based on conditions requiring immediate crew awareness or attention. Caution alerts may be alerts requiring immediate crew awareness in which subsequent corrective action will normally be necessary. Warning alerts may be alerts for detecting terrain threat that requires immediate crew action. Both caution and warning alerts may be presented as aural alerts, visual alerts, or both simultaneously. When presented visually, one or more colors may be presented on a display unit indicating one or more levels of alerts. For instance, yellow may indicate a caution alert and red may indicate a warning alert.

A crew alerting system 160 may receive input data from various systems including, but not limited to, terrain alerting processor 150 for processing as discussed herein. A crew alerting system 160 may be electronically coupled to a terrain alerting processor 150 to facilitate the receipt of input data. It is not necessary that a direct connection be made; instead, such receipt of input data could be provided through a data bus or through a wireless network.

Figure 2:
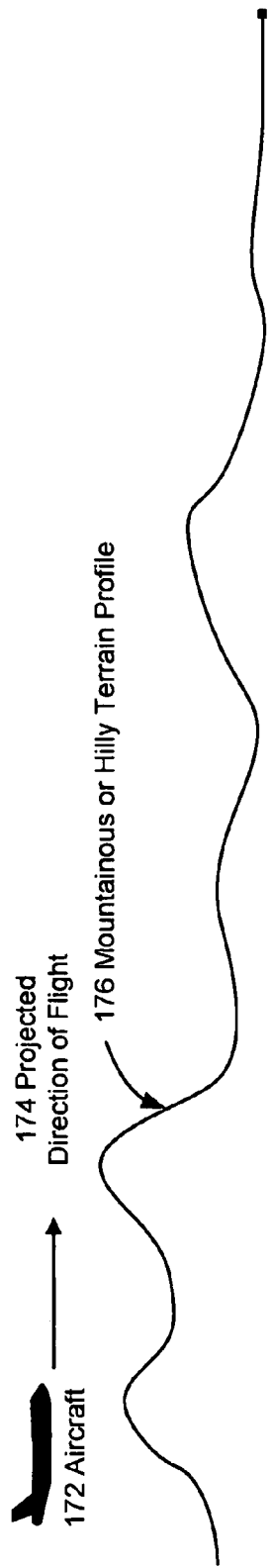
FIG. 2 depicts an exemplary illustration of a profile of a mountainous or hilly terrain over which an aircraft may operate.
Figure 3:
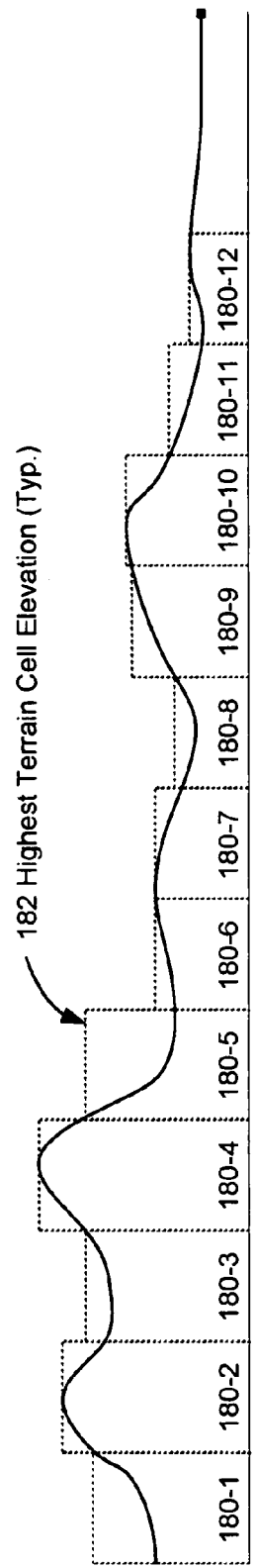
FIG. 3 depicts an exemplary illustration of a plurality of terrain cells corresponding to the mountainous or hilly terrain.
Figure 4:
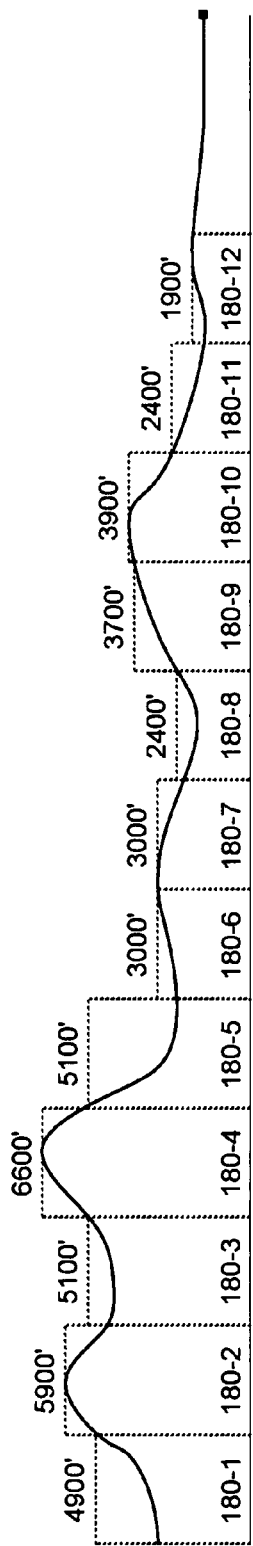
FIG. 4 provides an exemplary illustration of a plurality of terrain cell elevation data corresponding to the mountainous or hilly terrain.

The advantages and benefits of the embodiments discussed herein may be illustrated by showing examples of the plurality of altitudes defined herein which could provide terrain avoidance assurance. FIG. 2 provides an exemplar depiction of a profile of a mountainous or hilly terrain 176 over which an aircraft 172 may encounter in the projected direction of flight 174. FIG. 3 provides an illustration of a plurality of terrain cells 180-1 through 180-12 corresponding to the mountainous or hilly terrain 176 in the projected flight path 174. Once the plurality of projected terrain cells have been identified, the value of the highest terrain cell elevation 182 for each projected terrain cell may be identified. The values of corresponding to the highest terrain cell elevation 182 of each terrain are shown in FIG. 4. Is should be noted that the values have been randomly selected for the purposes of discussion and illustration only.

Figure 5:
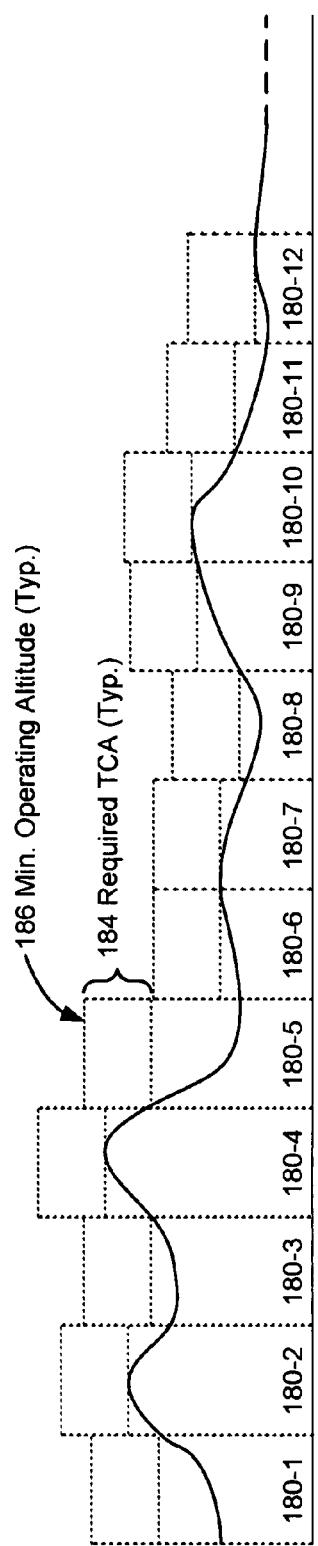
FIG. 5 provides an exemplary illustration of terminologies that may be used in the embodiments herein.

FIG. 5 provides an exemplar depiction of a required terrain clearance altitude ("required TCA") 184 and minimum operation altitude 186 for a typical terrain cell. The value of a required TCA 184 may not remain constant between take-off and landing. Instead, the value of a required TCA 184 may depend on the different phases of flight (e.g., terminal, approach, departure, and enroute), flight attitudes (e.g., level, descending, or climbing flight), or both.

A terminal phase of flight could exist when the aircraft is a pre-defined distance (e.g., 15 nautical miles) or less from the nearest runway while the range to the nearest runway threshold is decreasing and the aircraft is operating at or below (lower than) an upper terminal phase boundary altitude, where the value of the upper terminal phase boundary altitude varies as a function of height above runway and distance to the runway. Generally, the terminal phase of flight ends where the approach phase begins.

An approach phase of flight could exist when the aircraft is a pre-defined distance (e.g., 5 nautical miles) or less to the nearest runway threshold, the height above the nearest runway threshold location and elevation is equal to or less than a pre-defined altitude (e.g., 1,900 feet), and distance to the nearest runway threshold is decreasing.

A departure phase of flight could exist if an aircraft is on the ground upon initial power-up. A reliable parameter may be used to determine whether or not the aircraft is on the ground. For example, one parameter which could initially determine the aircraft to be on the ground could be a signal generated by a "squat switch" to indicate whether or not the aircraft is on the ground. Other parameters such as speed and altitude could be used to determine if the aircraft is on the ground or airborne. For example, an aircraft could be "on the ground" if it is operating at a speed less than 35 knots and altitude within +/−75 feet of field elevation or nearest runway elevation.

Similarly, an aircraft could be "airborne" if it is operating at a speed greater than 50 knots and altitude 100 feet greater than field elevation; in this example, it can be reliably determine that the aircraft is operating in the departure phase of flight. Other parameters which may be considered are climb state, and distance from departure runway. Once the aircraft reaches a pre-defined altitude (e.g., 1,500 feet above the departure runway), the Departure Phase could end.

An enroute phase of flight may exist anytime the aircraft is more than a pre-defined distance (e.g., 15 nautical miles) from the nearest airport or whenever the conditions for terminal, approach and departure phases of flight are not met.

As embodied herein, the value of a required TCA 184 may depend on a phase of flight and flight attitude. For example, if an aircraft is operating in the enroute phase of flight, a required TCA 184 could be 700 feet if operating in level flight attitude and 500 feet if operating in descending flight attitude. In another example, if an aircraft is operating in the terminal phase of flight, a required TCA 184 could be 350 feet if operating in level flight attitude and 300 feet operating in descending flight attitude. In another example, if an aircraft is operating in the approach phase of flight, a required TCA 184 could be 150 feet if operating in level flight attitude and 100 feet operating in descending flight attitude. The value of a required TCA 184 may depend on the phase of flight and not flight attitude. For example, if an aircraft is operating in the departure phase of flight, a required TCA 184 could be set to one value (e.g., 100 feet) irrespective of flight attitude. It should also be noted that level flight attitude may or may not include aircraft operating at relatively low vertical speeds and the values may differ across the phases of flight. For example, an aircraft climbing or descending at a rate of 500 per minute or less may be considered as operating in level flight in one phase of flight but not in another.

In one embodiment herein, an aircraft may be operating above a minimum operating altitude 186 in a descending phase of flight. In such operation, one or more than alerts may be generated at a height above terrain configurable as a function of the phase of flight and flight attitude parameter and the vertical speed data through which the aircraft is descending. For example, in an enroute phase of flight, one alert such as a caution alert may be generated at an altitude of 1200 feet above the terrain if the aircraft is descending at a rate of 1000 feet per minute and 1800 feet above the terrain if descending at 4000 feet per minute. In another example, in the enroute phase of flight, another alert such as a warning alert may be generated at an altitude of approximately 570 feet above the terrain if an aircraft is descending at a rate of 1000 feet per minute and approximately 980 feet if descending at a rate of 4000 feet per minute.

In another example, in a terminal phase of flight, a caution alert may be generated at an altitude of 700 feet above the terrain if the aircraft is descending at a rate of 1000 feet per minute and 1100 feet above the terrain if descending at 3000 feet per minute. In another example, in the terminal phase of flight, a warning alert may be generated at an altitude of approximately 330 feet above the terrain if an aircraft is descending at a rate of 1000 feet per minute and approximately 500 feet if descending at a rate of 3000 feet per minute.

In another example, in an approach phase of flight, a caution alert may be generated at an altitude of 350 feet above the terrain if the aircraft is descending at a rate of 500 feet per minute and 550 feet above the terrain if descending at 1500 feet per minute. In another example, in the approach phase of flight, a warning alert may be generated at an altitude of approximately 110 feet above the terrain if an aircraft is descending at a rate of 500 feet per minute and approximately 160 feet if descending at a rate of 1500 feet per minute.

Those skilled in the art will recognize the values used in the preceding examples are associated with some of the minimum performance standards of a Terrain Awareness and Warning System ("TAWS") published by the United States Federal Aviation Administration ("FAA") in TSO-C151 b. Although TSO-C151b states specific values of minimum terrain clearance altitudes, those skilled in the art will readily acknowledge that aviation regulatory authorities such as the FAA may modify minimum performance standards with subsequent changes, amendments, or revisions. In addition, other aviation regulatory authorities could develop separate minimum performance standards which differ from those published by the FAA. In addition, a pilot or owner of an aircraft may decide to configure one or more of the parameters discussed above. The embodiments and discussion herein with respect to phases of flight and values of required TCAs 184 are illustrations intended solely to provide examples and are in no way intended to be limited to those discussed and presented herein. As embodied herein, the terrain alerting processor 150 may determine phase of flight, flight attitude, and required TCA 184 data using on algorithms programmed in executable software code. Those skilled in the art will appreciate the ability and ease with which executable software code may be reprogrammed or modified to facilitate subsequent or concurrent performance standards without affecting or expanding the scope of the embodiments discussed herein.

FIG. 5 provides an illustration of an application of a minimum operating altitude 186 for each terrain cell. As shown in FIG. 5, a minimum operating altitude 186 for a terrain cell may be determined by adding the highest terrain cell elevation 182 (shown in FIG. 3) to the required TCA 184.

Figure 6:
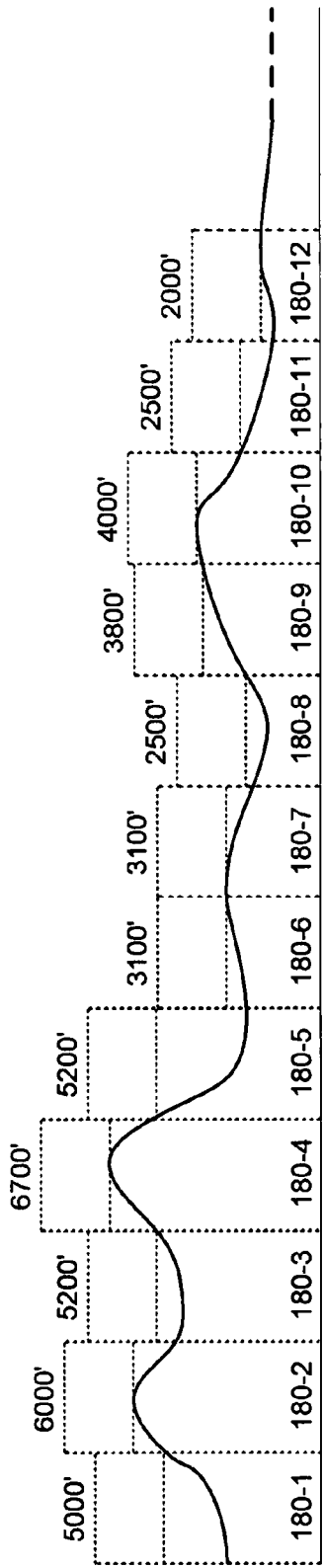
FIG. 6 provides an exemplary illustration of a plurality of terrain cell altitude data.

FIG. 6 illustrates the determination of the minimum operating altitude 186 for each terrain cell based upon an aircraft operating in the approach phase of flight in a descending flight attitude where a required TCA 184 has been set to 100 feet, the illustrative value of the required TCA 184 discussed above. A comparison between the values shown in FIG. 4 and FIG. 6 shows the 100 feet difference for each terrain cell, the value of the required TCA 184 of a descending aircraft in the approach phase of flight.

Figure 7:
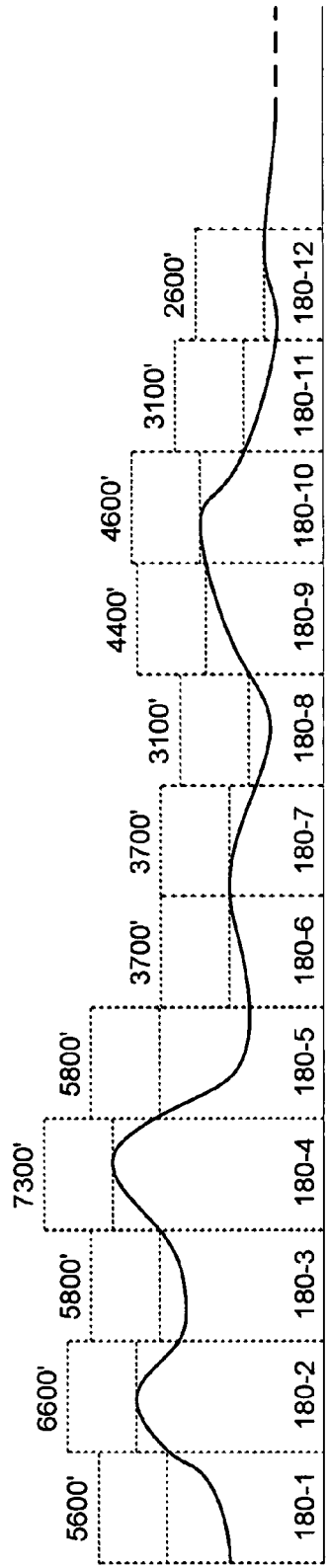
FIG. 7 provides an exemplary illustration of a plurality of terrain cell altitude data.

FIG. 7 illustrates the determination of the minimum operating altitude 186 for each terrain cell based upon an aircraft operating in the enroute phase of flight in a level flight attitude where a required TCA 184 has been set to 700 feet, the illustrative value of the required TCA 184 discussed above. A comparison between the values shown in FIG. 4 and FIG. 7 shows the 700 feet difference for each terrain cell, the value of the required TCA 184 of an aircraft in level flight in the enroute phase of flight. Likewise, a comparison between the values shown in FIG. 6 and FIG. 7 shows how the minimum operating altitudes 186 of the same cells may be different because of a change in phase in flight.

Figure 8:
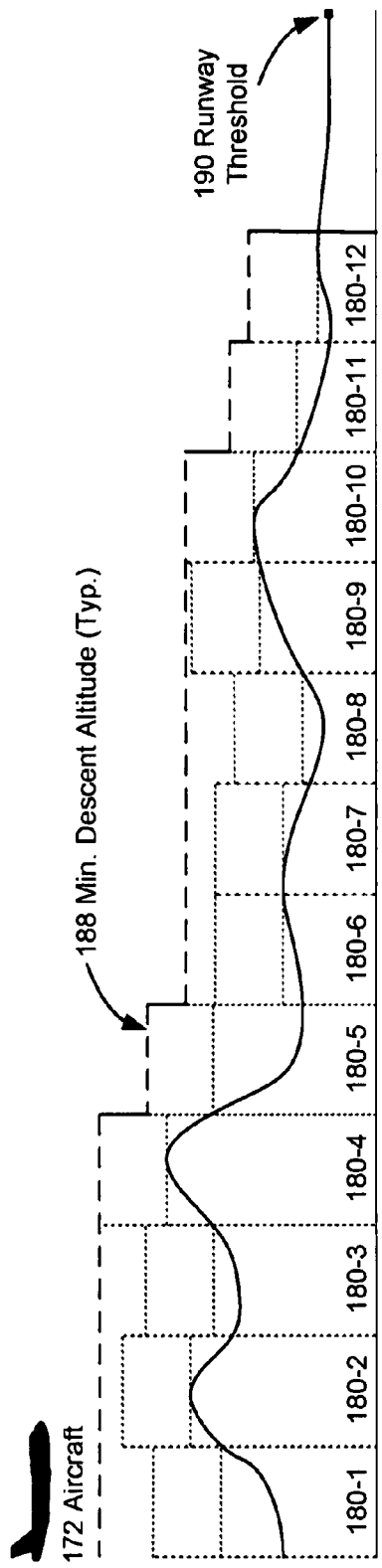
FIG. 8 provides an exemplary illustration of terminologies that may be used in the embodiments herein.
Figure 9:
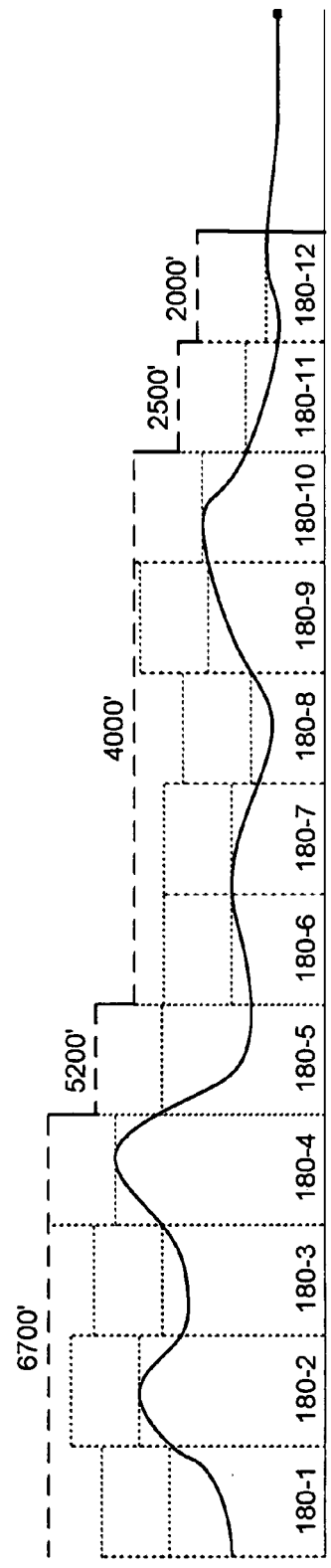
FIG. 9 provides an exemplary illustration of a plurality of terrain cell altitude data.

FIGS. 8 and 9 provide an illustration of an embodiment in which minimum descent altitudes 188 is determined from a runway threshold 190. In one embodiment, the value of a minimum descent altitude 188 is equal to (a) the value of the current minimum operating altitude 186 of the terrain cell over which the aircraft is operating if the value of current minimum operating altitude is greater than or equal to each value of the plurality of projected minimum operating altitudes 186 or (b) the greatest value among the plurality of values of projected minimum operating altitudes 186 if the value of the current minimum operating altitude 186 is less than at least one of the values among the plurality of values of projected minimum operating altitudes 186.

FIG. 9 illustrates the application of this embodiment of determining minimum descent altitudes for a plurality of projected terrain cells and forming a minimum descent profile. The plurality of terrain cells 180-1 through 180-12 corresponding to the projected flight path is depicted. The minimum operating altitudes for the plurality of terrain cells are also shown (without the values being depicted). From the current terrain cell 180-1 corresponding to the current location of aircraft 172, the plurality of projected terrain cells between the current position of the aircraft 172 and runway threshold 190 are examined to determine whether the minimum operating altitude of the current terrain cell is less than any of the minimum operating altitudes of the plurality of projected terrain cells 180-2 through 180-12. Upon examination of FIG. 6 where it is based upon an aircraft operating in the approach phase of flight in a descending flight attitude, the minimum operating altitude of cell 180-1 of 5,000 feet is less than cells 180-2 through 180-4 which have minimum operating altitudes of 6000 feet, 5200 feet, 6700 feet, respectively. Because the greatest of these values is 6700 feet for cell 180-4, the minimum descent altitude for each of the terrain cells between cells 180-1 and 180-4, inclusive, is set to 6700 feet as shown in FIG. 9. Then, this process is repeated by continuing with the next terrain cell 180-5.

The minimum operating altitude for terrain cell 180-5 is 5200 feet as shown in FIG. 6, and there are no other terrain cells in the remaining plurality of terrain cells less than this value; therefore, the minimum descent altitude for terrain cell 180-5 is set to 5200 feet as shown in FIG. 9. Continuing with the next terrain cell 180-6, it is noted in FIG. 6 that the minimum operating altitude of 3100 feet for terrain cell 180-6 is less than cells 180-9 and 180-10 which have minimum operating altitudes of 3800 feet and 4000 feet, respectively. Because the greatest of these values is 4000 feet for cell 180-10, the minimum descent altitude for each of the terrain cells 180-6 through 180-10, inclusive, is set to 4000 feet as shown in FIG. 9. Continuing with the next terrain cell 180-11, the minimum operating altitude is 2500 feet, and there are no other terrain cells in the remaining plurality of terrain cells less than this value; therefore, the minimum descent altitude for terrain cell 180-11 is set to 2500 feet as shown in FIG. 9. Continuing with the next terrain cell 180-12, the minimum operating altitude is 2000 feet, and this is the last remaining terrain cell from the plurality of terrain cells; therefore, the minimum descent altitude 188 for terrain cell 180-12 is set to 2000 feet as shown in FIG. 9.

Alternatively, beginning at the terrain cell closest to the runway threshold 190, the minimum descent altitude is set to the minimum operating altitude of 2000 feet of the terrain cell 180-12. Next, proceeding outwardly from the runway and along the projected flight path, the bordering terrain cell 180-11 is examined to determine whether its minimum operating altitude is greater than the minimum descent altitude of 180-12, and if it is, then the minimum descent altitude is set to be its corresponding minimum operating altitude. The minimum operating altitude for terrain cell 180-11 is 2500 feet as shown in FIG. 6, and because its minimum operating altitude is greater than the minimum descent altitude of 2000 feet of 180-12, the minimum operating altitude for terrain cell 180-11 is set to 2500 feet. Then, this process is repeated by proceeding outwardly from the runway threshold 190 and along the projected flight path for the remaining plurality of projected terrain cells.

The minimum operating altitude 186 for terrain cell 180-10 is 4000 feet as shown in FIG. 6, and because its minimum operating altitude is greater than the minimum descent altitude 188 of 2500 feet of 180-11, the minimum descent altitude 188 for terrain cell 180-10 is set to 4000 feet. Continuing with the next outwardly adjacent terrain cell, the minimum operating altitude 186 for terrain cell 180-9 is 3800 feet, and because its minimum operating altitude 186 is not greater the minimum descent altitude of 4000 feet, the minimum descent altitude for terrain cell 180-9 is set to 4000 feet. Continuing with the next three outwardly adjacent terrain cells, the minimum operating altitude for terrain cells 180-8 through 180-6 are not greater the minimum descent altitude of 4000 feet for terrain cell 180-9, and as such, the minimum descent altitudes for terrain cell 180-8 through 180-6, inclusive, are set to 4000 feet. Continuing with the next outwardly adjacent terrain cell, the minimum operating altitude 186 for terrain cell 180-5 is 5200 feet, and because its minimum operating altitude is greater the minimum descent altitude of 4000 feet, the minimum descent altitude 188 for terrain cell 180-5 is set to 5200 feet. Continuing with the next outwardly adjacent terrain cell, the minimum operating altitude 186 for terrain cell 180-4 is 6700 feet, and because its minimum operating altitude is greater the minimum descent altitude 188 of 5200 feet, the minimum descent altitude for terrain cell 180-4 is set to 6700 feet. Continuing with the next three outwardly adjacent terrain cells, the minimum operating altitude 186 for terrain cells 180-3 through 180-1 are not greater the minimum descent altitude 188 of 6,700 feet for terrain cell 180-4, and as such, the minimum descent altitudes for terrain cell 180-3 through 180-1, inclusive, are set to 6700 feet.

Figure 10:
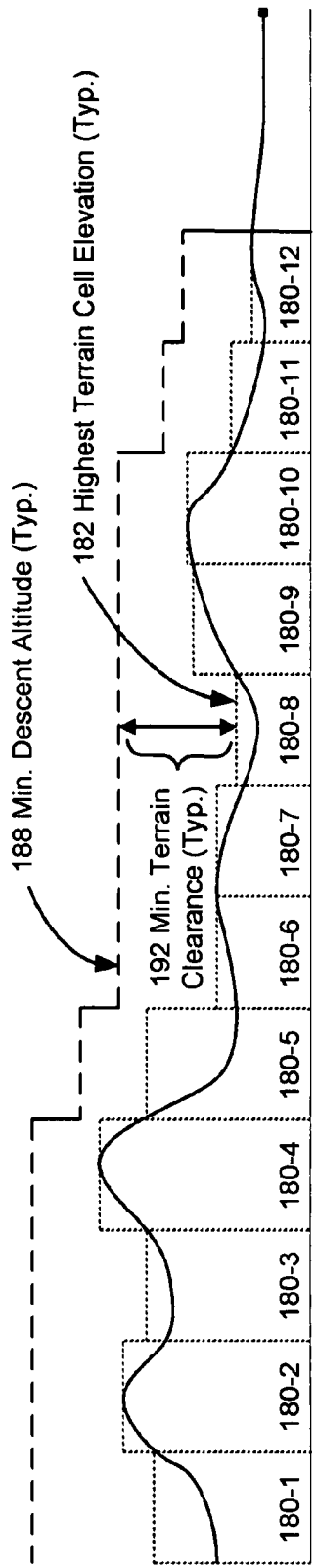
FIG. 10 provides an exemplary illustration of terminologies that may be used in the embodiments herein.
Figure 11:
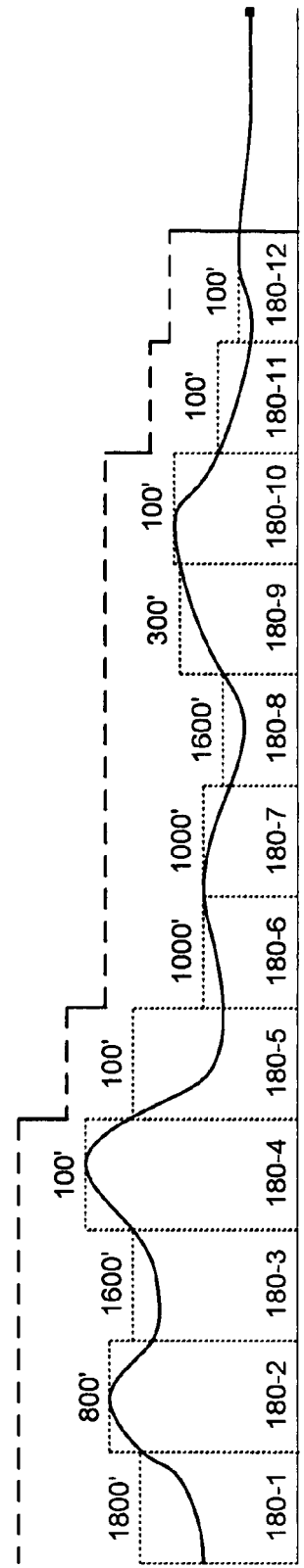
FIG. 11 provides an exemplary illustration of a plurality of terrain cell altitude data.

FIG. 10 provides an illustration of an embodiment in which a minimum terrain clearance altitude 192 which depicts that minimum terrain clearance altitude 192 as a function of minimum descent altitude 188 and highest terrain cell elevation 182 for each terrain cell. Generally, the minimum terrain clearance altitude 192 is the difference between the minimum descent altitude 188 and the highest terrain cell elevation 182. For the purposes of illustration, the values determined for the minimum descent altitude 188 for each cell as shown in FIG. 9 and highest terrain cell elevation 182 as shown in FIG. 4 will be used. By subtracting the values for each terrain cell shown in FIG. 9 from those corresponding values shown in FIG. 4, the minimum terrain clearance altitude 192 for each cell is determined, and these values are shown in FIG. 11. For example, the minimum terrain clearance altitude 192 for terrain cell 180-2 is set to 800 feet as shown in FIG. 11, the difference between the minimum descent altitude 188 of 6700 feet and highest terrain cell elevation 182 of 5900 feet. Likewise, the minimum terrain clearance altitude 192 for terrain cell 180-10 is set to 100 feet, the difference between the minimum descent altitude 188 of 4000 feet and the highest terrain cell elevation 182 of 3900 feet.

Figure 12:
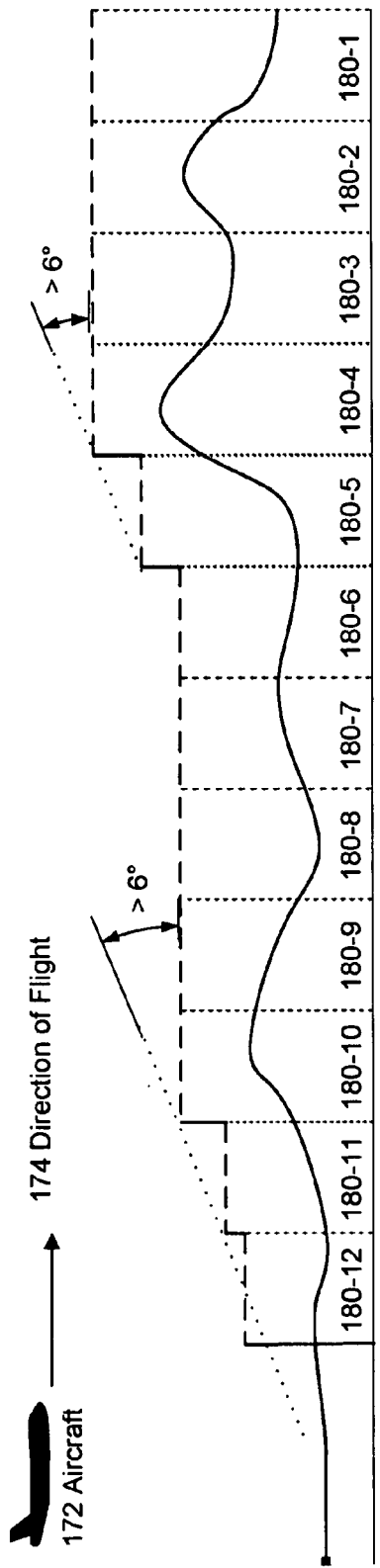
FIG. 12 provides an exemplary illustration of a plurality of terrain cells corresponding to an ascent flight profile.
Figure 13:
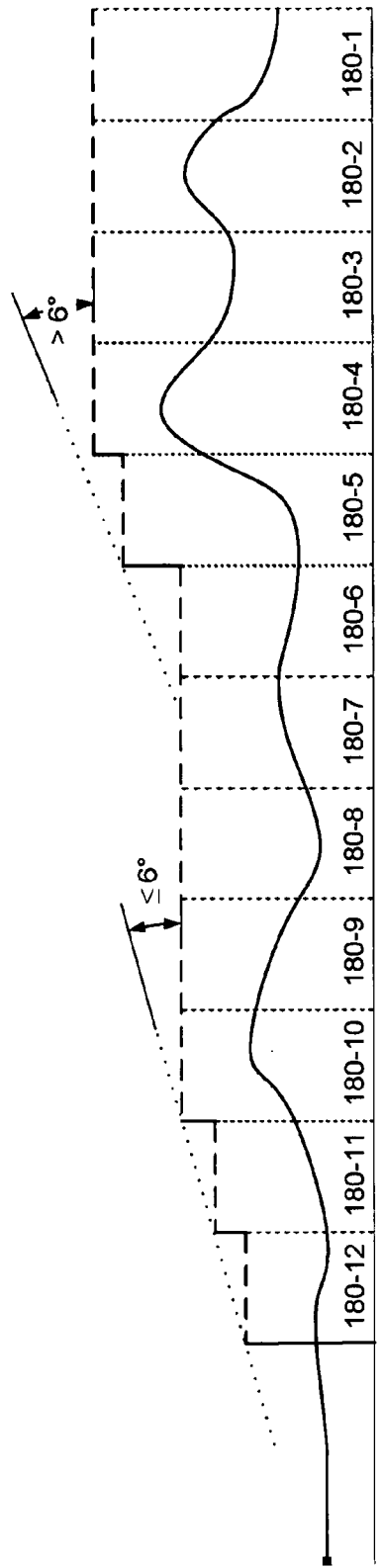
FIG. 13 provides an exemplary illustration of a plurality of terrain cells corresponding to an ascent flight profile.
Figure 14:
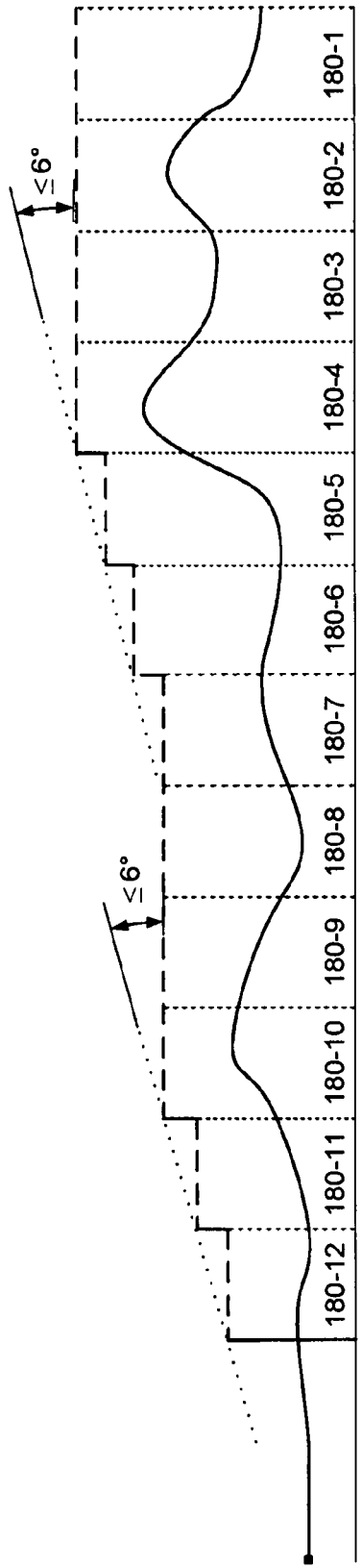
FIG. 14 provides an exemplary illustration of a plurality of terrain cells corresponding to an ascent flight profile.

FIGS. 12 through 15 provide an illustration of an embodiment in which a minimum ascent altitude 194 (see FIG. 15) is determined for each terrain cell. Generally, the minimum ascent altitude 194 is a as a function of minimum descent altitude 188 and a pre-defined maximum angle of climb. In other words, the minimum ascent altitude 194 may also be considered a function of minimum operating attitude 186 and a climb gradient. For the purposes of illustration herein, the pre-defined climb gradient or pre-defined maximum angle of climb will be equal to 6 degrees as shown in FIGS. 12 through 14.

FIG. 12 provides an exemplar depiction of a mirror image of the profile of a mountainous or hilly terrain 176 over which an aircraft 172 may encounter in the projected direction of flight 174 that was introduced in FIG. 2 and repeatedly referenced in FIGS. 3 through 11. The values of the highest terrain cell elevation 182 and minimum descent altitude 188 for each terrain cell are assumed to be the same for terrain cell 180-1 through 180-12 shown in FIGS. 12 through 15. Initially, the minimum ascent altitude 194 for each terrain cell would be set to the same value as the minimum descent altitude 188 for each terrain cell. However, an additional assurance is required to confirm that the angle formed between the leading edge of two adjacent terrain cells does not exceed the pre-determined climb gradient. If the angle of climb is exceeded, then the minimum ascent altitude 194 of the terrain cell closer to the runway threshold will have to be increased to an altitude which ensures the angle of climb between two adjacent terrain cells does not exceed the pre-determined climb gradient.

For example, referring to FIG. 12, the angle of climb between terrain cells 180-11 and 180-10 is greater than 6 degrees, where the minimum ascent altitude is 2500 feet for 180-11 and 4000 feet for terrain cell 180-10 (the initial values which correspond to the minimum descent altitudes shown in FIG. 9). As such, minimum ascent altitude of terrain cell 180-11 will have to be increased until the angle of climb is 6 degrees or less. In this example, setting the minimum ascent altitude to 3000 feet will ensure the maximum angle of climb between the leading edges of terrain cells 180-11 and 180-10 will not exceed the pre-determined climb gradient as shown in FIG. 13.

Figure 15:
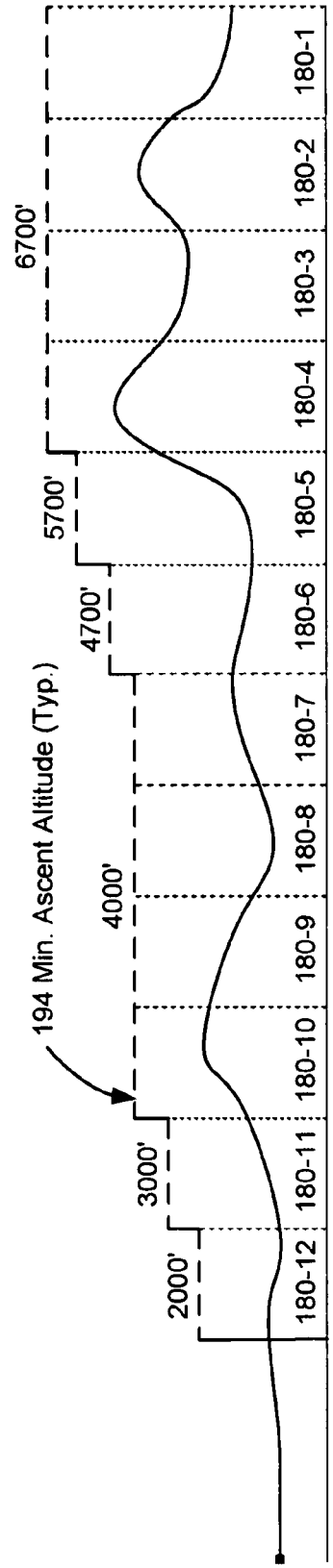
FIG. 15 provides an exemplary illustration of terminology that may be used in the embodiments herein.

In addition, the angle of climb between terrain cells 180-5 and 180-4 is greater than 6 degrees, where the minimum ascent altitude 194 is 5200 feet for 180-5 and 6700 feet for terrain cell 180-4 (the initial values which correspond to the minimum descent altitudes shown in FIG. 9). As such, minimum ascent altitude 194 of terrain cell 180-5 will have to be increased until the maximum angle of climb is 6 degrees or less. In this example, setting the minimum ascent altitude 194 to 5700 feet will ensure the maximum angle of climb between the leading edges of terrain cells 180-5 and 180-4 will not be exceeded as shown in FIG. 13. However, setting the minimum ascent altitude of terrain cell 180-5 to 5700 feet has resulted with the angle of climb that is greater than 6 degrees between terrain cells 180-6 and 180-5 as shown in FIG. 13. As such, the minimum ascent altitude 194 will have to be increased. In this example, setting the minimum ascent altitude 194 of 4700 feet (from the minimum descent altitude of 4000 feet shown in FIG. 9) will ensure the maximum angle of climb between the leading edges of terrain cells 180-6 and 180-5 will not be exceeded as shown in FIGS. 14 and 15.

Figure 16:
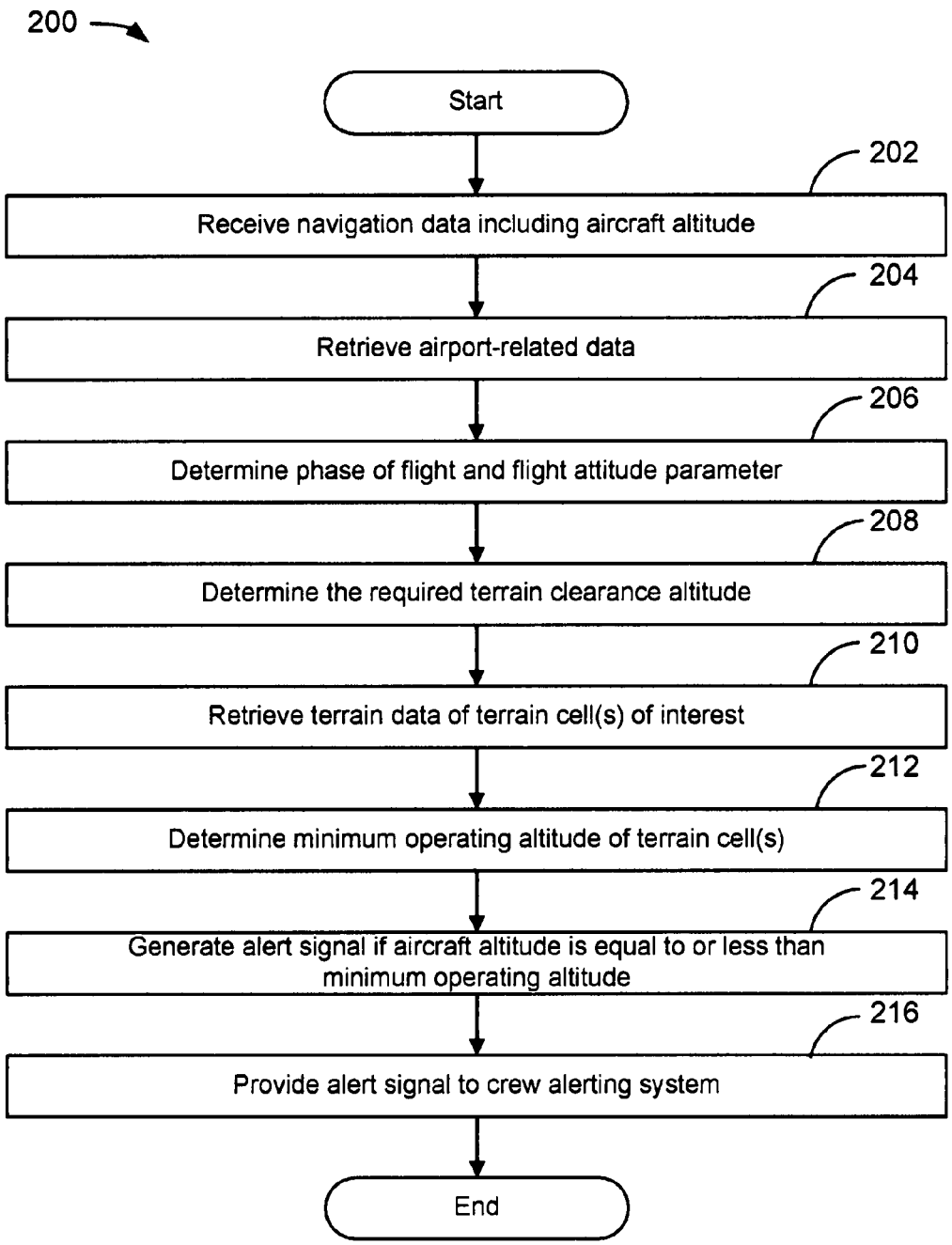
FIG. 16 provides a flowchart illustrating a method for providing generating an alert signal in a terrain-awareness and warning system.

FIG. 16 depicts a flowchart 200 of an example of a method for generating an alert signal in a terrain awareness and warning system. The flowchart begins with module 202 with the receiving of navigation data including aircraft position, altitude and attitude of the aircraft in flight. The navigation data could be provided by a navigation system 110. Attitude data 116 could indicate the flight attitude of the aircraft, e.g., climbing, descending, or level flight. Altitude data could be used to compute the phase of flight, e.g., enroute, terminal, approach, or departure. The flowchart continues with module 204 with the retrieving of airport-related data of nearest airport which could be used in the determination of the phase of flight and flight attitude parameter. Distances from airports, runways, runway threshold, or a combination of all of these may be used to determine the phase of flight of the aircraft. The flowchart continues with module 206 determining a phase of flight and flight attitude parameter using the navigation data and airport-related data. This value could be written into the software being executed a terrain alerting processor 150 or could be stored in a database and retrieved by the terrain alerting processor 150. The flowchart continues with module 208 with the determining the value of a required terrain clearance altitude 184 associated with the phase of flight and flight attitude parameter. This value could be written into the software being executed a terrain alerting processor 150 or could be stored in a database and retrieved by the terrain alerting processor 150.

The flowchart continues with module 210 with the retrieving terrain data of a terrain cell from a terrain database 140, the location of which corresponds to the aircraft position. A terrain database 140 could store terrain data of a plurality of terrain cells, wherein each terrain cell includes data representative of a value of the highest elevation of the terrain cell 182. In one embodiment, the location of the terrain cell may correspond to the aircraft position. The flowchart continues with module 212 with the determining of the value of a current minimum operating altitude 186 of the current terrain cell. The current minimum operating value 186 as a function of the value of the highest elevation of the current terrain cell 182 and the value of the required terrain clearance altitude 184. The flowchart continues with module 214 generating an alert signal if the value of the aircraft altitude 114 is less than the value of the minimum operating altitude 186. In another embodiment, the user may wish to configure the alert to generate when the altitude 114 is equal to the value of the minimum operating altitude 186. In the embodiment of FIG. 16, this may be considered as a first alert signal if the terrain alerting processor 150 is configured to generate additional alerts based upon other conditions. The flowchart continues with module 216 with the providing the alert signal to a crew alerting system 160. In one embodiment, the alert signal could cause a caution or warning alert on the display of the crew altering system 160. In another embodiment, the first alert signal could cause the presentation of an aural alert by the aural alert unit. Then, the flowchart proceeds to the end.

In an additional embodiment, the method of flowchart 200 may include projected flight path information 120 being received from a navigation system 110, and terrain data of each cell along the projected path being retrieved from a terrain database 140. The terrain alerting processor 150 could determine a value of a projected minimum operating altitude 186 of each terrain cell along the projected path. The value of each projected minimum operating altitude could be the sum of the value of the highest terrain elevation 182 retrieved and the required terrain clearance altitude 184. A value of a minimum descent altitude 188 could then be determined by a terrain alerting processor 150 as a function of the greatest value between the current minimum operating altitude and the projected minimum operating altitude for each terrain cell along the projected path. If the value of the aircraft altitude is less than the value of the minimum descent altitude 188, then a second alert signal could be generated and provided to the crew alerting system 160. In addition, the alert signal could also be generated and provided to the crew alerting system if the value of the aircraft altitude is equal to the value of the minimum descent altitude.

In an additional embodiment, the method of flowchart 200 may include data representative of a projected flight path 120 and vertical speed 122 being received, and terrain data of each terrain cell along the projected path being retrieved from a terrain database 140. The data retrieved corresponds to locations along the projected path and represents the value of the highest elevation of each terrain cell 182 along the projected path. Then, the terrain alerting processor 150 could determine a value of a projected minimum operating altitude of each terrain cell along the projected path, wherein the value of each projected minimum operating altitude could be the sum of the highest terrain elevation of the respective terrain cell and the required terrain clearance altitude 184. Then, a value of a minimum descent altitude 188 could be determined as being the highest value between the values of the current minimum operating altitude and the values of the projected minimum operating altitude for each terrain cell along with project path. Then, a value of a caution alert clearance altitude could be determined as a function of the vertical speed and the phase of flight and flight attitude parameter, the value of the caution alert clearance altitude increasing with a corresponding increase in the rate or angle of descent. Then, a value of a descent caution altitude could be determined as being the sum of the value of the minimum descent altitude and the value of the caution alert clearance altitude. A third alert signal could be generated if the value of the aircraft altitude is less than the value of the descent caution altitude and provided to the crew alerting system 160. In addition, the third alert signal could also be generated and provided to the crew alerting system if the value of the aircraft altitude is equal to the value of the descent caution altitude.

In an additional embodiment, the method of flowchart 200 may include data representative of a projected flight path 120 and vertical speed 122 being received, and terrain data of each terrain cell along the projected path being retrieved from a terrain database 140. The data retrieved corresponds to locations along the projected path and represents the value of the highest elevation of each terrain cell 182 along the projected path. Then, a terrain alerting processor 150 could determine a value of a projected minimum operating altitude 186 of each terrain cell along the projected path, wherein the value of each projected minimum operating altitude could be the sum of the highest terrain elevation of the respective terrain cell and the required terrain clearance altitude 184. Then, a value of a minimum descent altitude 188 could be determined as being the highest value between the values of the current minimum operating altitude and the values of the projected minimum operating altitude for each terrain cell along with project path. Then, a value of a warning alert clearance altitude could be determined as a function of the vertical speed and the phase of flight and flight attitude parameter, the value of the warning alert clearance altitude increasing with a corresponding increase in the rate or angle of descent. Then, a value of a descent warning altitude could be determined as being the sum of the value of the minimum descent altitude and the value of the warning alert clearance altitude. A fourth alert signal could be generated if the value of the aircraft altitude is less than the value of the descent warning altitude and provided to the crew alerting system 160. In addition, the fourth alert signal could also be generated and provided to the crew alerting system if the value of the aircraft altitude is equal to the value of the descent warning altitude.

In an additional embodiment, the method of flowchart 200 may include navigation data representative of aircraft speed 118 being received. Then, a value of a minimum ascent altitude 188 could be determined by a terrain alerting processor 150 as a function of the value of the current minimum operating altitude 186, the value of the projected minimum operating altitude of each terrain cell along the projected path, and a variable climb gradient. A climb gradient may vary because of factors associated with aircraft performance. For example, those skilled in the art know that an aircraft performance decreases with increases in altitude, outside temperature, and humidity conditions. As another example, those skilled in the art know that aircraft performance could be affected by factors associated with aircraft weight and balance. A climb gradient may also be configurable by the manufacturer or operator of an aircraft and set to a unique specification. It is noted that a climb gradient may be based upon additional factors and should not be limited to the preceding examples. A climb factor could be contained in an algorithm contained in executable code, and with data representative of aircraft performance being provided as input to a terrain alerting processor 150, a value associated with the variable climb gradient could be determined by the processor. If the value of the aircraft altitude is less than the value of the minimum ascent altitude, a fifth alert signal could be generated and provided to the crew alerting system 160. In addition, a fifth alert signal could be generated and provided to the crew alerting system if the value of the aircraft altitude is equal to the value of the minimum ascent altitude.

In an additional embodiment, the method of flowchart 200 may include navigation data representative of aircraft vertical speed 122 being received. Then, a value of a caution alert clearance altitude could be determined by a terrain alerting processor 150 as a function of the vertical speed and the phase of flight and flight attitude parameter, the value of the current minimum caution altitude increasing with a corresponding increase in the rate or angle of descent. A value of an ascent caution altitude could be determined as the sum of the value of the minimum ascent altitude and the value of the caution alert clearance altitude. If the value of the aircraft altitude is less than the value of the ascent caution altitude, a sixth alert signal could be generated and provided to a crew alerting system 160. In addition, the sixth alert signal could be generated and provided to a crew alerting system if the value of the aircraft altitude is equal to the value of the ascent caution altitude.

In an additional embodiment, the method of flowchart 200 may include navigation data representative of aircraft vertical speed 122 being received. Then, a value of a warning alert clearance altitude could be determined by a terrain alerting processor 150 as a function of the vertical speed and the phase of flight and flight attitude parameter, the value of the current minimum warning altitude increasing with a corresponding increase in the rate or angle of descent. A value of an ascent warning altitude could be determined as the sum of the value of the minimum ascent altitude and the value of the warning alert clearance altitude. If the value of the aircraft altitude is less than the value of the ascent warning altitude, a seventh alert signal could be generated and provided to a crew alerting system 160. In addition, the seventh alert signal could be generated and provided to a crew alerting system if the value of the aircraft altitude is equal to the value of the ascent warning altitude.

Figure 17:
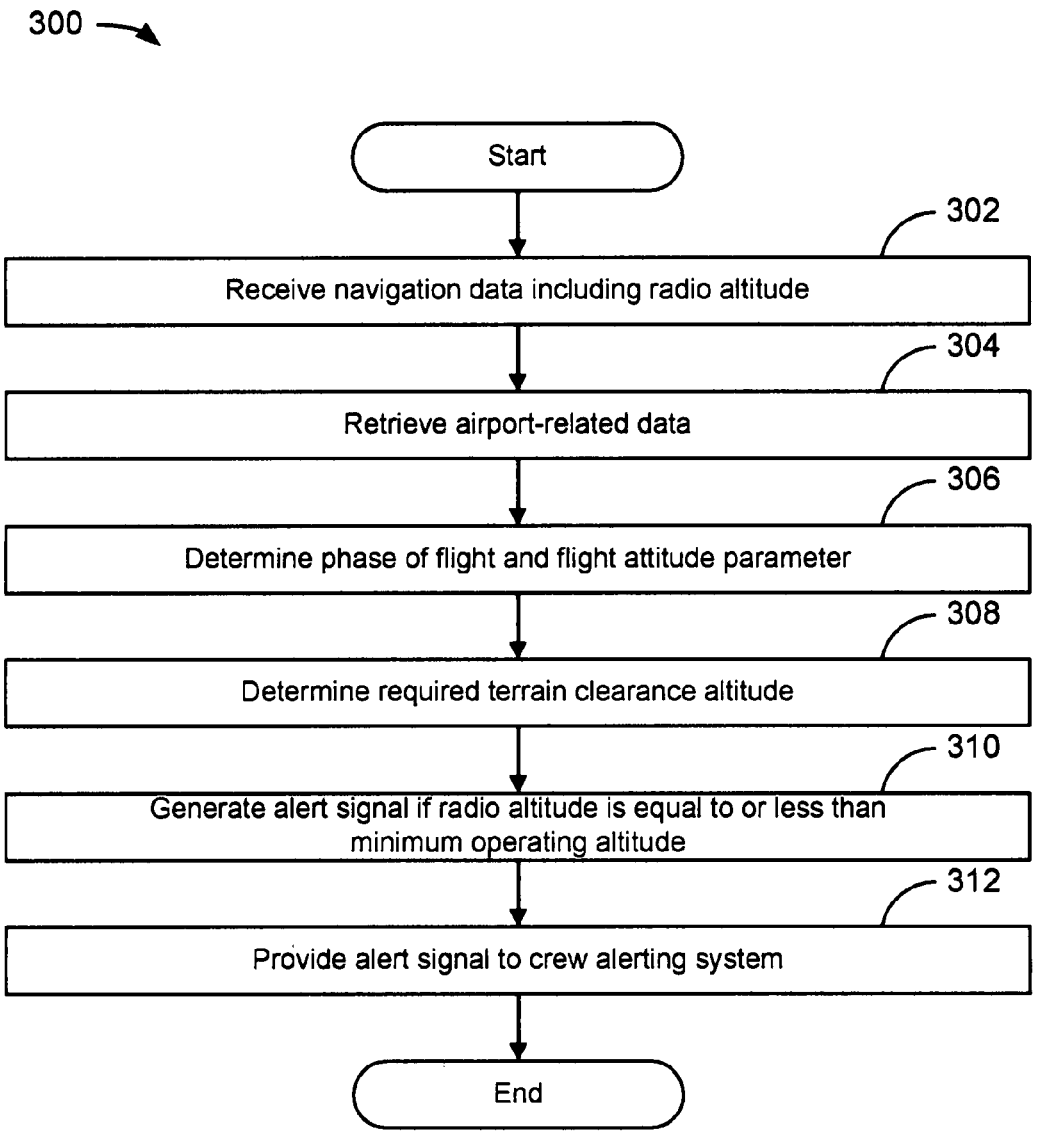
FIG. 17 provides a flowchart illustrating a second method for providing generating an alert signal in a terrain-awareness and warning system.

FIG. 17 depicts a flowchart 300 of an example of a second method for generating an alert signal in a terrain awareness and warning system. The flowchart begins with modules 302 with the receiving of navigation data including aircraft position, altitude, radio altitude, and attitude of the aircraft in flight. The navigation data could be provided by a navigation system 110 which for the purposes of the embodiments herein, include data relating to radio altitude 124. Attitude data 116 could indicate the flight attitude of the aircraft, e.g., climbing, descending, or level flight. Altitude data could be used to compute the phase of flight, e.g., enroute, terminal, approach, or departure. The flowchart continues with modules 304, 306, and 308 which could perform the same functions as disclosed in modules 204, 206, and 208, respectively.

The flowchart continues with module 310 with the generating an alert signal by a terrain alerting processor 150 if the value of the aircraft radio altitude 124 is less than the value of the terrain clearance altitude 184. In another embodiment, the user may wish to configure the alert to generate when the radio altitude 124 is equal to the value of the terrain clearance altitude 184. In the embodiment of FIG. 17, this may be considered as a first alert signal if the terrain alerting processor 150 is configured to generate additional alerts based upon other conditions. The flowchart continues with module 312 with the providing an alert signal to a crew alerting system 160. In one embodiment, the alert signal could cause a caution or warning alert on the display of the crew altering system 160. In another embodiment, the first alert signal could cause the presentation of an aural alert by the aural alert unit. Then, the flowchart proceeds to the end.

In an additional embodiment, the method of flowchart 300 may include data representative of a projected flight path 120 of the aircraft in flight being received, and terrain data of each terrain cell along the projected path being retrieved. The data retrieved may correspond to locations along the projected path and represents the value of the highest elevation of each terrain cell 182 along the projected path. Then, a projected minimum operating radio altitude for each terrain cell along the projected path could then be determined by a terrain alerting processor 150, wherein the value of each projected minimum operating radio altitude could be the difference between the value of the highest terrain elevation of the respective terrain cell and the value of the aircraft altitude. Then, a value of a minimum descent radio altitude could be determined as a function of the projected minimum operating radio altitude for each terrain cell along the projected path and the required terrain clearance altitude. If the value of the aircraft radio altitude is less than the value of the minimum descent radio altitude, a second alert signal could be generated and provided to the crew alerting system 160. In addition, a second alert signal could be generated and provided to the crew alerting system if the value of the aircraft radio altitude is equal to the value of the minimum descent radio altitude.

In an additional embodiment, the method of flowchart 300 may include data representative of a projected flight path 120 and vertical speed 122 of the aircraft in flight being received, and terrain data of each terrain cell along the projected path being retrieved. The data retrieved could correspond to locations along the projected path and represent the value of the highest elevation of each terrain cell 182 along the projected path. Then, a value of a projected minimum operating radio altitude for each terrain cell along the projected path could be determined by a terrain alerting processor 150, wherein the value of each projected minimum operating radio altitude could be the difference between the value of the highest terrain elevation of the respective terrain cell and the value of the aircraft altitude. Then, a value of a minimum descent radio altitude could be determined as a function of the projected minimum operating radio altitude for each terrain cell along the projected path and the required terrain clearance altitude. Then, a value of a caution alert radio altitude could be determined as a function of the vertical speed data and the phase of flight and flight attitude parameter, the value of the caution alert clearance radio altitude increasing with a corresponding increase in the rate or angle of descent. If the value of the aircraft radio altitude is less than the value of the caution alert radio altitude, a third alert signal could be generated and provided to a crew alerting system 160. In addition, a third alert signal could be generated and provided to a crew alerting system if the value of the aircraft radio altitude is equal to the value of the caution alert radio altitude.

In an additional embodiment, the method of flowchart 300 may include data representative of a projected flight path 120 and vertical speed 122 of the aircraft in flight being received, and terrain data of each terrain cell along the projected path being retrieved. The data retrieved could correspond to locations along the projected path and represent the value of the highest elevation of each terrain cell 182 along the projected path. Then, a value of a projected minimum operating radio altitude for each terrain cell along the projected path could be determined by a terrain alerting processor 150, wherein the value of each projected minimum operating radio altitude could be the difference between the value of the highest terrain elevation of the respective terrain cell and the value of the aircraft altitude. Then, a value of a minimum descent radio altitude could be determined as a function of the highest value between projected minimum operating radio altitude for each terrain cell along the projected path and the required terrain clearance altitude. Then, a value of a warning alert radio altitude could be determined as a function of the vertical speed data and the phase of flight and flight attitude parameter, the value of the warning alert clearance radio altitude increasing with a corresponding increase in the rate or angle of descent. If the value of the aircraft radio altitude is less than the value of the warning alert radio altitude, a fourth alert signal could be generated and provided to a crew alerting system 160. In addition, a fourth alert signal could be generated and provided to a crew alerting system if the value of the aircraft radio altitude is equal to the value of the warning alert radio altitude.

Figure 18:
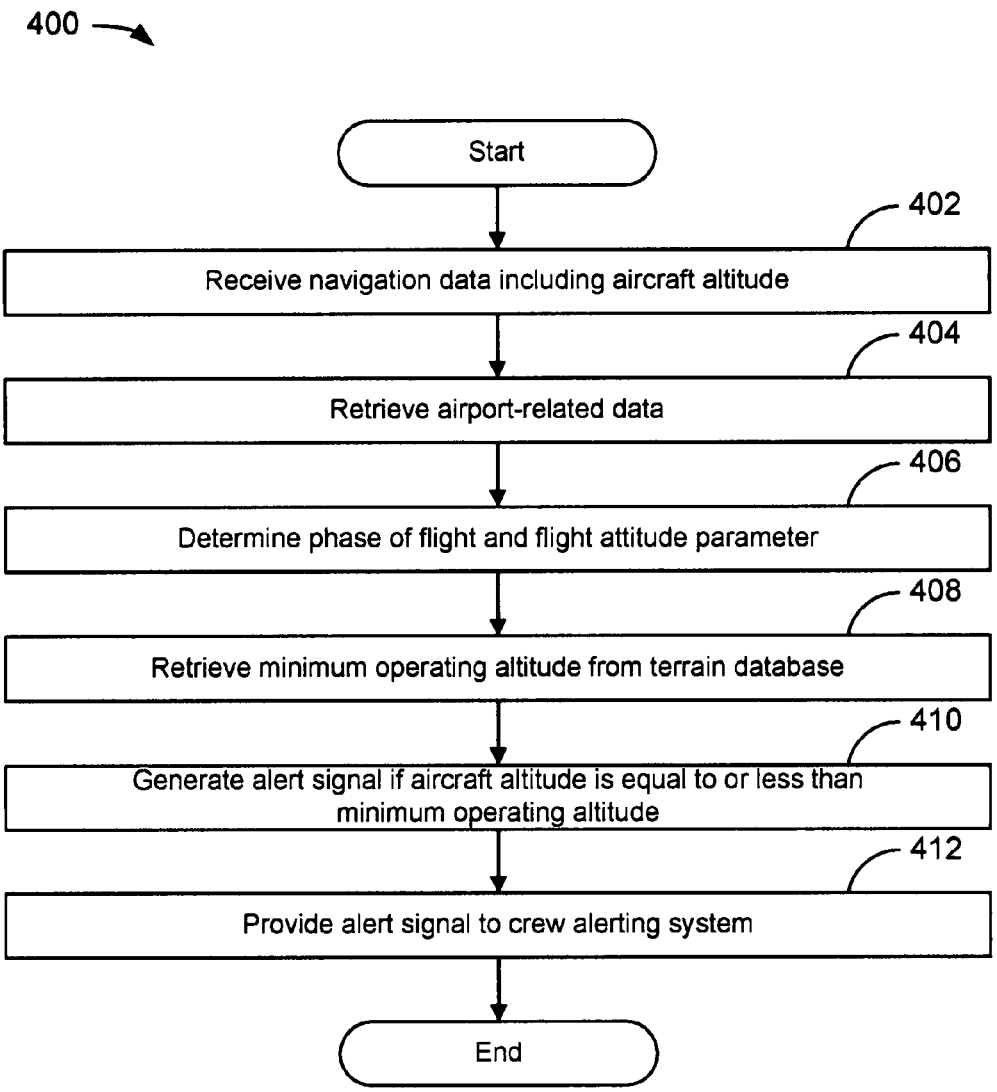
FIG. 18 provides a flowchart illustrating a third method for providing generating an alert signal in a terrain-awareness and warning system.

FIG. 18 depicts a flowchart 400 of an example of a third method for generating an alert signal in a terrain awareness and warning system. The flowchart begins with modules 402, 404, and 406 which could perform the same functions as disclosed in modules 204, 204, and 206, respectively. The flowchart continues with module 408 with the retrieving terrain data of a terrain cell from a terrain database 140, the location of which corresponds to the aircraft position. A terrain database 140 could store terrain data of a plurality of terrain cells, wherein each terrain cell includes data representative of a value of a minimum operating altitude 186. In an embodiment of FIG. 18, data contained in a terrain data cell of a minimum operating altitude 186 could be the sum of the highest elevation found within the terrain cell 182 and a required terrain clearance altitude 184 specified in a terrain awareness and warning system, where the minimum operating altitude 186 may depend upon a phase of flight and flight attitude. The terrain database 140 could store a minimum operating altitude 186 per phase of flight and flight attitude in one embodiment. In another embodiment, a terrain database 140 may be comprised of a plurality of databases where each database stored one or more minimum operating altitudes 186 corresponding to specific phases of flight and flight attitudes.

The flowchart continues with module 410 with the generating an alert signal by a terrain alerting processor 150 if the value of the aircraft altitude 114 is less than the value of the minimum operating altitude 186. In another embodiment, the user may wish to configure the alert to generate when the altitude 114 is equal to the value of the minimum operating altitude 186. In the embodiment of FIG. 18, this may be considered as a first alert signal if the terrain alerting processor 150 is configured to generate additional alerts based upon other conditions. The flowchart continues with module 412 with the providing an alert signal to a crew alerting system 160. In one embodiment, the alert signal could cause a caution or warning alert on the display of the crew altering system 160. In another embodiment, the first alert signal could cause the presentation of an aural alert by the aural alert unit. Then, the flowchart proceeds to the end.

In an additional embodiment, the method of flowchart 400 may include data representative of a projected flight path 120 of the aircraft in flight being received, and projected minimum operating altitude data 186 of each terrain cell along the projected path being retrieved from the terrain database 140, wherein each projected minimum operating altitude corresponds to a respective terrain cell along the projected path and is associated with the phase of flight and flight attitude parameter. Then, a value of a minimum descent altitude could be determine by a terrain alerting processor 150 as the highest value between the current minimum operating altitude data and projected minimum operating altitude date of each terrain cell along the projected path. If the value of the aircraft altitude is less than the value of the minimum descent altitude, and second alert signal could be generated and provided to a crew alerting system 160. In addition, the second alert signal could be generated and provided to a crew alerting system if the value of the aircraft altitude is equal to the value of the minimum descent altitude, and In an additional embodiment, the method of flowchart 400 may include data representative of a projected flight path 120 and vertical speed 122 of the aircraft in flight, and projected minimum operating altitude data 186 of each terrain cell along the projected path being retrieved from the terrain database 140, wherein each projected minimum operating altitude corresponds to a respective terrain cell along the projected path and is associated with the phase of flight and flight attitude parameter. Then, a value of a minimum descent altitude could be determined by a terrain alerting processor 150 as the highest value between the current minimum operating altitude data and projected minimum operating altitude date of each terrain cell along the projected path. Then, a value of a caution alert clearance altitude could be determined as a function of the vertical speed data and the phase of flight and flight attitude parameter, the value of the caution alert clearance altitude increasing with a corresponding increase in the rate or angle of descent. Then, a value of a descent caution altitude could be determined as the sum of the value of the minimum descent altitude and the value of the caution alert clearance altitude. If the value of the aircraft altitude is less than the value of the descent caution altitude, a third alert signal could be generated and provided to a crew alerting system 160. In addition, a third alert signal could be generated and provided to a crew alerting system if the value of the aircraft altitude is equal to the value of the descent caution altitude.

In an additional embodiment, the method of flowchart 400 may include data representative of a projected flight path 120 and vertical speed 122 of the aircraft in flight, and projected minimum operating altitude data 186 of each terrain cell along the projected path being retrieved from the terrain database 140, wherein each projected minimum operating altitude corresponds to a respective terrain cell along the projected path and is associated with the phase of flight and flight attitude parameter. Then, a value of a minimum descent altitude could be determined by a terrain alerting processor 150 as the highest value between the current minimum operating altitude data and projected minimum operating altitude date of each terrain cell along the projected path. Then, a value of a warning alert clearance altitude could be determined as a function of the vertical speed data and the phase of flight and flight attitude parameter, the value of the warning alert clearance altitude increasing with a corresponding increase in the rate or angle of descent. Then, a value of a descent warning altitude could be determined as the sum of the value of the minimum descent altitude and the value of the warning alert clearance altitude. If the value of the aircraft altitude is less than the value of the descent warning altitude, a fourth alert signal could be generated and provided to a crew alerting system 160. In addition, a fourth alert signal could be generated and provided to a crew alerting system if the value of the aircraft altitude is equal to the value of the descent warning altitude.

In an additional embodiment, the method of flowchart 400 may include data representative of aircraft speed 118 of the aircraft in flight being received. Then, a value of a minimum ascent altitude could be determined by a terrain alerting processor 150 as a function of the value of the current minimum operating altitude, the value of the projected minimum operating altitude of each terrain cell along the projected path, and variable climb gradient data. As discussed above, a variable climb gradient could be determined by many factors including, but not limited to, aircraft performance factors. If the value of the aircraft altitude is less than the value of the minimum ascent altitude, a fifth alert signal could be generated and provided to a crew alerting system 160. In addition, a fifth alert signal could be generated and provided to a crew alerting system if the value of the aircraft altitude is equal to the value of the minimum ascent altitude.

In an additional embodiment, the method of flowchart 400 may include data representative of aircraft vertical speed 122 of the aircraft in flight being received. Then, a value of a caution alert clearance altitude could be determined by a terrain alerting processor 150 as a function of the vertical speed data and the phase of flight and flight attitude parameter, the value of the caution alert clearance altitude increasing with a corresponding decrease in the rate or angle of climb. Then, a value of an ascent caution altitude could be determined as the sum of the value of the minimum ascent altitude and the value of the caution alert clearance altitude. If the value of the aircraft altitude is less than the value of the ascent caution altitude, a sixth alert signal could be generated and provided to a crew alerting system 160. In addition, a sixth alert signal could be generated and provided to a crew alerting system if the value of the aircraft altitude is equal to the value of the ascent caution altitude.

In an additional embodiment, the method of flowchart 400 may include data representative of aircraft vertical speed 122 of the aircraft in flight being received. Then, a value of a warning alert clearance altitude could be determined by a terrain alerting processor 150 as a function of the vertical speed data and the phase of flight and flight attitude parameter, the value of the caution alert clearance altitude increasing with a corresponding decrease in the rate or angle of climb. Then, a value of an ascent warning altitude could be determined as the sum of the value of the minimum ascent altitude and the value of the warning alert clearance altitude. If the value of the aircraft altitude is less than the value of the ascent warning altitude, a seventh alert signal could be generated and provided to a crew alerting system 160. In addition, a seventh alert signal could be generated and provided to a crew alerting system if the value of the aircraft altitude is equal to the value of the ascent warning altitude.

Figure 19:
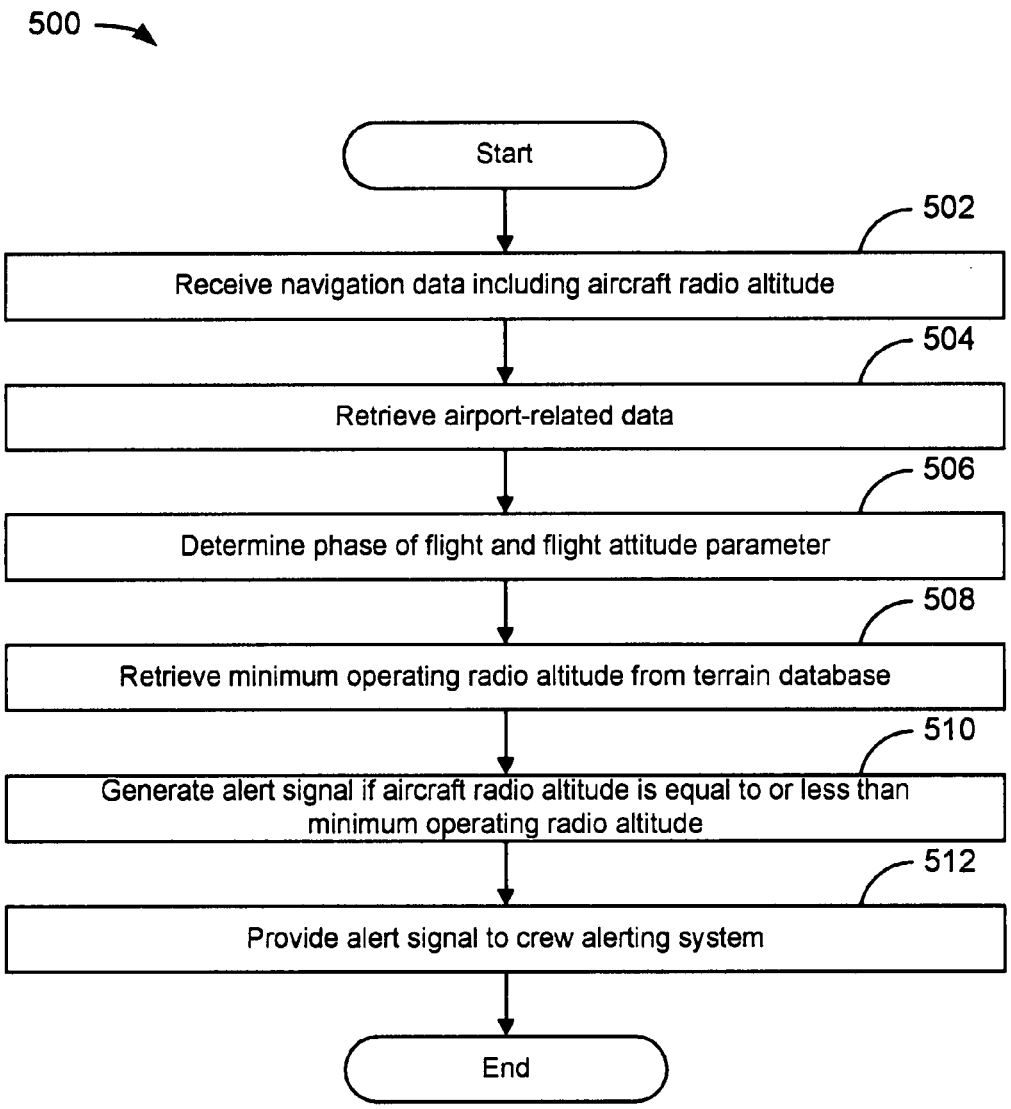
FIG. 19 provides a flowchart illustrating a fourth method for providing generating an alert signal in a terrain-awareness and warning system.

FIG. 19 depicts a flowchart 500 of an example of a fourth method for generating an alert signal in a terrain awareness and warning system. The flowchart begins with modules 502, 504, and 506 which could perform the same functions as disclosed in modules 304, 304, and 306, respectively. The flowchart continues with module 508 with the retrieving terrain data of a terrain cell from a terrain database 140, the location of which corresponds to the aircraft position. A terrain database 140 could store terrain data of a plurality of terrain cells, wherein each terrain cell includes data representative of a value of a minimum operating radio altitude. In an embodiment of FIG. 19, data contained in a terrain data cell of a minimum operating radio altitude could be the sum of the highest elevation found within the terrain cell 182 and a required terrain clearance altitude 184 specified in a terrain awareness and warning system, where the minimum operating altitude 186 may depend upon a phase of flight and flight attitude. The terrain database 140 could store a minimum operating altitude 186 per phase of flight and flight altitude in one embodiment. In another embodiment, a terrain database 140 may be comprised of a plurality of databases where each database stored one or more minimum operating altitudes 186 corresponding to specific phases of flight and flight attitudes.

The flowchart continues with module 510 with the generating an alert signal by a terrain alerting processor 150 if the value of the aircraft radio altitude is less than the value of the minimum operating radio altitude. In another embodiment, the user may wish to configure the alert to generate when the radio altitude is equal to the value of the minimum operating radio altitude. In the embodiment of FIG. 19, this may be considered as a first alert signal if the terrain alerting processor 150 is configured to generate additional alerts based upon other conditions. The flowchart continues with module 512 with the providing an alert signal to a crew alerting system 160. In one embodiment, the alert signal could cause a caution or warning alert on the display of the crew altering system 160. In another embodiment, the first alert signal could cause the presentation of an aural alert by the aural alert unit. Then, the flowchart proceeds to the end.

In an additional embodiment, the method of flowchart 500 may include data representative of a projected flight path 120 of the aircraft in flight being received, and a projected minimum operating radio altitude of each terrain cell along the projected path being retrieved from a terrain database 140, wherein each projected minimum operating radio altitude corresponds to a respective terrain cell along the projected path and is associated with the phase of flight and flight attitude parameter. Then, a value of a minimum descent radio altitude could be determined by a terrain alerting processor 150 as a function of the value of the current minimum radio altitude and the value of the projected minimum operating radio altitude of each terrain cell along the projected path. If the value of the aircraft radio altitude is less than the value of the minimum descent radio altitude, then a second alert signal could be generated and provided to a crew alerting system 160. In addition, a second alert signal could be generated and provided to a crew alerting system 160 if the value of the aircraft radio altitude is equal to the value of the minimum descent radio altitude.

In an additional embodiment, the method of flowchart 500 may include data representative of a projected flight path 120 and vertical speed 122 of the aircraft in flight being received, and a projected minimum operating radio altitude associated with each terrain cell along the projected path being retrieved from the terrain database 140, wherein each projected minimum operating radio altitude corresponds to a respective terrain cell along the projected path and associated with the phase of flight and flight attitude parameter. Then, a minimum descent radio altitude could be determined by a terrain alerting processor 150 as a function of the value of the current minimum radio altitude and the value of the projected minimum operating radio altitude of each terrain cell along the projected path. Then, a value of a caution alert radio altitude could be determined as a function of the vertical speed data and the phase of flight and flight attitude parameter. If the value of the aircraft radio altitude is less than the value of the caution alert radio altitude; a third alert signal could be generated and provided to a crew alerting system 160. In addition, a third alert signal could be generated and provided to a crew alerting system if the value of the aircraft radio altitude is equal to the value of the caution alert radio altitude.

In an additional embodiment, the method of flowchart 500 may include data representative of a projected flight path 120 and vertical speed 122 of the aircraft in flight being received, and a projected minimum operating radio altitude associated with each terrain cell along the projected path being retrieved from the terrain database 140, wherein each projected minimum operating radio altitude corresponds to a respective terrain cell along the projected path and associated with the phase of flight and flight attitude parameter. Then, a minimum descent radio altitude could be determined by a terrain alerting processor 150 as a function of the value of the current minimum radio altitude and the value of the projected minimum operating radio altitude of each terrain cell along the projected path. Then, a value of a warning alert radio altitude could be determined as a function of the vertical speed data and the phase of flight and flight attitude parameter. If the value of the aircraft radio altitude is less than the value of the warning alert radio altitude; a fourth alert signal could be generated and provided to a crew alerting system 160. In addition, a fourth alert signal could be generated and provided to a crew alerting system if the value of the aircraft radio altitude is equal to the value of the warning alert radio altitude.

It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation. It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an alert signal in a terrain awareness and warning system of an aircraft, said system comprising:
    a navigation system;
    a source of terrain data;
    a source of airport data;
    a terrain alert processor configured to
        receive from the navigation system navigation data representative of the current position, projected flight path, altitude, and attitude of an aircraft in flight,
        acquire from the source of airport data airport-related data representative of the nearest airport from the current position of the aircraft,
        determine a phase of flight and flight attitude parameter as a function of the navigation data and the airport-related data,
        determine one first value representative of a required terrain clearance altitude associated with the phase of flight and flight attitude parameter,
        acquire first terrain data and second terrain data from the source of terrain data based upon the current position and the projected flight path of the aircraft, where
            the first terrain data is representative of one second value, where
                the second value is representative of one elevation of one terrain cell over which the aircraft is currently operating, and
            the second terrain data is representative of a plurality of third values, where
                the plurality of third values is representative of elevations of terrain cells over which the aircraft is projected to operate and other than the one terrain cell over which the aircraft is currently operating,
        determine one fourth value as a function of the first value and the second value, where
            the fourth value is representative of one first minimum operating altitude of the one terrain cell over which the aircraft is currently operating,
        generate a first alert signal comprised of a first visual alert if the altitude of the aircraft is equal to or less than the fourth value only, where
            the first visual alert is a visual indication regarding the terrain over which the aircraft is currently operating only,
        provide the first alert signal to a crew alerting system,
        determine a plurality of fifth values as a function of the first value and the plurality of third values, where
            the plurality of fifth values is representative of a plurality of second minimum operating altitudes of the terrain cells over which the aircraft is projected to operate and other than the one terrain cell over which the aircraft is currently operating,
        determine one sixth value as a function of the fourth value and the plurality of fifth values, where
            the sixth value is representative of one minimum descent altitude,
        generate a second alert signal comprised of a second visual alert if the altitude of the aircraft is equal to or less than the sixth value only, where
            the second visual alert is a visual indication regarding terrain other than the terrain over which the aircraft is currently operating, and
        provide the second alert signal to the crew alerting system; and
    the crew alerting system comprised of at least one display unit and configured to
        receive the first alert signal and the second alert signal, such that
            the first visual alert is produced on a display unit when the first alert signal is received, and
            the second visual alert is produced on a display unit when the second alert signal is received.

2. The system of claim 1, wherein
the terrain alert processor is further configured to
    receive navigation data further representative of a vertical speed of the aircraft,
    determine one seventh value as a function of the vertical speed of the aircraft and the phase of flight and flight attitude parameter, where
        the seventh value is representative of a first alert clearance altitude,
    determine one eighth value as a function of the sixth value and the seventh value, where
        the eighth value is representative of a first descent alert altitude,
    generate a third alert signal comprised of a third visual alert if the altitude of the aircraft is equal to or less than the eighth value, where
        the third alert signal is an alert signal other than the first alert signal and the second alert signal, and provide the third alert signal to the crew alerting system; and the crew alerting system is further configured to receive the third alert signal.

3. The system of claim 2, wherein
the terrain alert processor is further configured to
    determine one ninth value as a function of the vertical speed of the aircraft and the phase of flight and flight attitude parameter, where
        the ninth value is representative of a second alert clearance altitude,
    determine one tenth value as a function of the sixth value and the ninth value, where
        the tenth value is representative of a second descent alert altitude,
    generate a fourth alert signal comprised of a fourth visual alert if the altitude of the aircraft is equal to or less than the tenth value, where
        the fourth alert signal is an alert signal other than the first alert signal, the second alert signal, and the third alert signal, and
    provide the fourth alert signal to the crew alerting system; and
the crew alerting system is further configured to receive the fourth alert signal.

4. The system of claim 1, wherein
the terrain alert processor is further configured to
    receive navigation data further representative of a speed of the aircraft,
    determine one seventh value as a function of the third value, the plurality of fifth values, and variable climb gradient data, where
        the seventh value is representative of a minimum ascent altitude,
    generate a third alert signal comprised of a third visual alert if the altitude of the aircraft is equal to or less than the seventh value, where
        the third alert signal is an alert signal other than the first alert signal and the second alert signal, and
    provide the third alert signal to the crew alerting system; and
the crew alerting system is further configured to receive the third alert signal.

5. The system of claim 4, wherein
the terrain alert processor is further configured to
    receive navigation data further representative of a vertical speed of the aircraft,
    determine one eighth value as a function of the vertical speed of the aircraft and the phase of flight and flight attitude parameter, where
        the eight value is representative of a first alert clearance altitude,
    determine one ninth value as a function of the seventh value and the eighth value, where
        the ninth value is representative of a first ascent alert altitude,
    generate a fourth alert signal comprised of a fourth visual alert if the altitude of the aircraft is equal to or less than the ninth value, where
        the fourth alert signal is an alert signal other than the first alert signal, the second alert signal, and the third alert signal, and
    provide the fourth alert signal to the crew alerting system; and
the crew alerting system is further configured to receive the fourth alert signal.

6. The system of claim 5, wherein
the terrain alert processor is further configured to
    determine one tenth value as a function of the vertical speed of the aircraft and the phase of flight and flight attitude parameter, where
        the tenth value is representative of a second alert clearance altitude,
    determine one eleventh value as a function of the seventh value and the tenth value, where
        the eleventh value is representative of a second ascent alert altitude,
    generate a fifth alert signal comprised of a fifth visual alert if the altitude of the aircraft is equal to or less than the eleventh value, where
        the fifth alert signal is an alert signal other than the first alert signal, the second alert signal, the third alert signal, and the fourth alert signal, and
    provide the fifth alert signal to the crew alerting system; and
the crew alerting system is further configured to receive the fifth alert signal.

7. The system of claim 1, wherein
the first alert signal is further comprised of a first aural alert,
the second alert signal is further comprised of a second aural alert, where
    the first aural alert is an aural indication regarding the terrain over which the aircraft is currently operating only,
    the second aural alert is an aural indication regarding terrain other than the terrain over which the aircraft is currently operating only, and
the crew alerting system is further comprised of at least one aural alert unit configured to
    receive the first alert signal and the second alert signal, such that
        the first aural alert is produced via an aural alert unit when the first alert signal is received, and
        the second aural alert is produced via an aural alert unit when the second alert signal is received.

8. A system for generating an alert signal in a terrain awareness and warning system of an aircraft, said system comprising:
    a navigation system;
    a source of predefined, minimum operating altitude terrain cell data;
    a source of airport data;
    a terrain alert processor configured to
        receive from the navigation system navigation data representative of the current position, projected flight path, altitude, and attitude of an aircraft in flight,
        acquire from the source of airport data airport-related data representative of the nearest airport from the current position of the aircraft,
        determine a phase of flight and flight attitude parameter as a function of the navigation data and the airport-related data,
        acquire first minimum operating altitude data and second minimum operating altitude data from the source of predefined, minimum operating altitude terrain cell data based upon the phase of flight and flight attitude parameter and the current position of the aircraft, where
            the first minimum operating altitude data is representative of a first value per the phase of flight and flight attitude parameter, where the first value is representative of one first predefined, minimum operating altitude of one terrain cell over which the aircraft is currently operating, the second minimum operating altitude data is representative of a plurality of second values per the phase of flight and flight attitude parameter, where the plurality of second values is representative of second predefined, minimum operating altitudes of terrain cells over which the aircraft is projected to operate and other than the one terrain cell over which the aircraft is currently operating, generate a first alert signal comprised of a first visual alert if the altitude of the aircraft is equal to or less than the first value only, where the first visual alert is a visual indication regarding the terrain over which the aircraft is currently operating only, provide the first alert signal to a crew alerting system, determine one third value as a function of the first value and the plurality of second values, where the third value is representative of one minimum descent altitude, generate a second alert signal comprised of a second visual alert if the altitude of the aircraft is equal to or less than the third value only, the second visual alert is a visual indication regarding terrain other than the terrain over which the aircraft is currently operating, and provide the second alert signal to the crew alerting system; and the crew alerting system comprised of at least one display unit and configured to receive the first alert signal and the second alert signal, such that the first visual alert is produced on a display unit when the first alert signal is received, and the second visual alert is produced on a display unit when the second alert signal is received.

9. The system of claim 8, wherein the terrain alert processor is further configured to receive navigation data further representative of a vertical speed of the aircraft, determine one fourth value as a function of the vertical speed of the aircraft and the phase of flight and flight attitude parameter, where the fourth value is representative of a first alert clearance altitude, determine one fifth value as a function of the third value and the fourth value, where the fifth value is representative of a first descent alert altitude, generate a third alert signal comprised of a third visual alert if the altitude of the aircraft is equal to or less than the fifth value, where the third alert signal is an alert signal other than the first alert signal and the second alert signal, and provide the third alert signal to the crew alerting system; and the crew alerting system is further configured to receive the third alert signal.

10. The system of claim 9, wherein the terrain alert processor is further configured to determine one sixth value as a function of the vertical speed of the aircraft and the phase of flight and flight attitude parameter, where the sixth value is representative of a second alert clearance altitude, determine one seventh value as a function of the third value and the sixth value, where the seventh value is representative of a second descent alert altitude, generate a fourth alert signal comprised of a fourth visual alert if the altitude of the aircraft is equal to or less than the seventh value, where the fourth alert signal is an alert signal other than the first alert signal, the second alert signal, and the third alert signal, and provide the fourth alert signal to the crew alerting system; and the crew alerting system is further configured to receive the fourth alert signal.

11. The system of claim 8, wherein the terrain alert processor is further configured to receive navigation data further representative of a speed of the aircraft, determine one fourth value as a function of the third value, the plurality of fifth values, and variable climb gradient data only, where the fourth value is representative of a minimum ascent altitude, generate a third alert signal comprised of a third visual alert if the altitude of the aircraft is equal to or less than the fourth value, where the third alert signal is an alert signal other than the first alert signal and the second alert signal, and provide the third alert signal to the crew alerting system; and the crew alerting system is further configured to receive the third alert signal.

12. The system of claim 11, wherein the terrain alert processor is further configured to receive navigation data further representative of a vertical speed of the aircraft, determine one fifth value as a function of the vertical speed of the aircraft and the phase of flight and flight attitude parameter, where the fifth value is representative of a first alert clearance altitude, determine one sixth value as a function of the fourth value and the fifth value only, where the sixth value is representative of a first ascent alert altitude, generate a fourth alert signal comprised of a fourth visual alert if the altitude of the aircraft is equal to or less than the sixth value, where the fourth alert signal is an alert signal other than the first alert signal, the second alert signal, and the third alert signal, and provide the fourth alert signal to the crew alerting system; and the crew alerting system is further configured to receive the fourth alert signal.

13. The system of claim 12, wherein the terrain alert processor is further configured to determine one seventh value as a function of the vertical speed of the aircraft and the phase of flight and flight attitude parameter, where the seventh value is representative of a second alert clearance altitude, determine one eighth value as a function of the fourth value and the seventh value, where
the eighth value is representative of a second ascent alert altitude, generate a fifth alert signal comprised of a fifth visual alert if the altitude of the aircraft is equal to or less than the eighth value, where
the fifth alert signal is an alert signal other than the first alert signal, the second alert signal, the third alert signal, and the fourth alert signal, and provide the fifth alert signal to the crew alerting system; and the crew alerting system is further configured to receive the fifth alert signal.

14. The system of claim 8, wherein
the first alert signal is further comprised of a first aural alert,
the second alert signal is further comprised of a second aural alert, where
the first aural alert is an aural indication regarding the terrain over which the aircraft is currently operating only,
the second aural alert is an aural indication regarding terrain other than the terrain over which the aircraft is currently operating only, and the crew alerting system is further comprised of at least one aural alert unit configured to
receive the first alert signal and the second alert signal, such that
the first aural alert is produced via an aural alert unit when the first alert signal is received, and
the second aural alert is produced via an aural alert unit when the second alert signal is received.

15. The system of claim 8, wherein
the source of predefined, minimum operating altitude terrain cell data is comprised of
at least one terrain database comprised of the plurality of terrain cells, where
each terrain cell is comprised of
a plurality of predefined, minimum operating altitudes per phase of flight and flight attitude, or
one predefined, minimum operating altitude per a specific phase of flight and flight attitude.

16. A system for generating an alert signal in a terrain awareness and warning system of an aircraft, said system comprising:
a navigation system;
a source of terrain data;
a source of airport data;
a terrain alert processor configured to
receive from the navigation system navigation data representative of the current position, projected flight path, altitude, attitude, and radio altitude of an aircraft in flight,
acquire from the source of airport data airport-related data representative of the nearest airport from the current position of the aircraft,
determine a phase of flight and flight attitude parameter as a function of the navigation data and the airport-related data,
determine one first value representative of a required terrain clearance altitude associated with the phase of flight and flight attitude parameter,
generate a first alert signal comprised of a first visual alert if the radio altitude of the aircraft is equal to or less than the first value only, where
the first visual alert is a visual indication regarding terrain directly under the aircraft only, provide the first alert signal to a crew alerting system,
acquire terrain data from the source of terrain data based upon the projected flight path of the aircraft, where
the terrain data is representative of a plurality of second values, where
the plurality of second values is representative of elevations of terrain cells over which the aircraft is projected to operate and other than the terrain directly under the aircraft only, determine a plurality of third values as a function of the first value and the plurality of second values, where
the plurality of third values is representative of a plurality of minimum operating radio altitudes of the terrain cells over which the aircraft is projected to operate and other than the terrain directly under the aircraft, determine one fourth value as a function of the first value and the plurality of third values,
the fourth value is representative of one minimum descent radio altitude, generate a second alert signal comprised of a second visual alert if the radio altitude of the aircraft is equal to or less than the fourth value only, where
the second visual alert is a visual indication regarding terrain other than the terrain directly under the aircraft, and provide the second alert signal to the crew alerting system; and the crew alerting system comprised of at least one display unit and configured to
receive the first alert signal and the second alert signal, such that
the first visual alert is produced on a display unit when the first alert signal is received, and
the second visual alert is produced on a display unit when the second alert signal is received.

17. The system of claim 16, wherein
the terrain alert processor is further configured to
receive navigation data further representative of the vertical speed of the aircraft, determine one fifth value as a function of the vertical speed of the aircraft and the phase of flight and flight attitude parameter, where
the fifth value is representative of a first alert radio altitude, generate a third alert signal comprised of a third visual alert if the radio altitude of the aircraft is equal to or less than the fifth value, where
the third alert signal is an alert signal other than the first alert signal and the second alert signal, and
provide the third alert signal to the crew alerting system; and the crew alerting system is further configured to receive the third alert signal.

18. The system of claim 17, wherein
the terrain alert processor is further configured to
determine one sixth value as a function of the vertical speed of the aircraft and the phase of flight and flight attitude parameter, where
the sixth value is representative of a second alert radio altitude, generate a fourth alert signal comprised of a fourth visual alert if the radio altitude of the aircraft is equal to or less than the sixth value, where the fourth alert signal is an alert signal other than the first alert signal, the second alert signal, and the third alert signal, and provide the fourth alert signal to the crew alerting system; and the crew alerting system is further configured to receive the fourth alert signal.

19. The system of claim 16, wherein the first alert signal is further comprised of a first aural alert, the second alert signal is further comprised of a second aural alert, where the first aural alert is an aural indication regarding the terrain directly under the aircraft only, the second aural alert is an aural indication regarding terrain other than the terrain directly under the aircraft only, and the crew alerting system is further comprised of at least one aural alert unit configured to receive the first alert signal and the second alert signal, such that the first aural alert is produced via an aural alert unit when the first alert signal is received, and the second aural alert is produced via an aural alert unit when the second alert signal is received.

20. A method for generating an alert signal in a terrain awareness and warning system of an aircraft, said method comprising:

receiving navigation data representative of the current position, projected flight path, altitude, and attitude of an aircraft in flight;

acquiring airport-related data representative of the nearest airport from the current position of the aircraft;

determining a phase of flight and flight attitude parameter as a function the navigation data and the airport-related data;

determining one first value representative of a required terrain clearance altitude associated with the phase of flight and flight attitude parameter;

acquiring first terrain data and second terrain data based upon the current position and the projected flight path of the aircraft, where the first terrain data is representative of one second value, where the second value is representative of one elevation of one terrain cell over which the aircraft is currently operating, and the second terrain data is representative of a plurality of third values, where the plurality of third values is representative of elevations of terrain cells over which the aircraft is projected to operate and other than the one terrain cell over which the aircraft is currently operating;

determining one fourth value as a function of the first value and the second value, where the fourth value is representative of one first minimum operating altitude of the one terrain cell over which the aircraft is currently operating;

generating a first alert signal comprised of a first visual alert if the altitude of the aircraft is equal to or less than the fourth value only, where the first visual alert is a visual indication regarding the terrain over which the aircraft is currently operating only;

providing the first alert signal to a crew alerting system comprised of at least one display unit;

determining a plurality of fifth values as a function of the first value and the plurality of third values, where the plurality of fifth values is representative of a plurality of second minimum operating altitudes of the terrain cells over which the aircraft is projected to operate and other than the one terrain cell over which the aircraft is currently operating;

determining one sixth value as a function of the fourth value and the plurality of fifth values, where the sixth value is representative of one minimum descent altitude;

generating a second alert signal comprised of a second visual alert if the altitude of the aircraft is equal to or less than the sixth value only, where the second visual alert is a visual indication regarding terrain other than the terrain over which the aircraft is currently operating; and providing the second alert signal to the crew alerting system, such that the first visual alert is produced on a display unit when the first alert signal is received, and the second visual alert is produced on a display unit when the second alert signal is received.

21. The method of claim 20, further comprising:

receiving navigation data further representative of a vertical speed of the aircraft;

determining one seventh value as a function of the vertical speed of the aircraft and the phase of flight and flight attitude parameter, where the seventh value is representative of a first alert clearance altitude;

determining one eighth value as a function of the sixth value and the seventh value, where the eighth value is representative of a first descent alert altitude;

generating a third alert signal comprised of a third visual alert if the altitude of the aircraft is equal to or less than the eighth value, where the third alert signal is an alert signal other than the first alert signal and the second alert signal; and providing the third alert signal to the crew alerting system.

22. The method of claim 21, further comprising:

determining one ninth value as a function of the vertical speed of the aircraft and the phase of flight and flight attitude parameter only, where the ninth value is representative of a second alert clearance altitude;

determining one tenth value as a function of the sixth value and the ninth value, where the tenth value is representative of a second descent alert altitude;

generating a fourth alert signal comprised of a fourth visual alert if the altitude of the aircraft is equal to or less than the tenth value, where the fourth alert signal is an alert signal other than the first alert signal, the second alert signal, and the third alert signal; and providing the fourth alert signal to the crew alerting system.

23. The method of claim 20, further comprising:

receiving navigation data further representative of a speed of the aircraft;

determining one seventh value as a function of the third value, the plurality of fifth values, and variable climb gradient data, where the seventh value is representative of a minimum ascent altitude;

generating a third alert signal comprised of a third visual alert if the altitude of the aircraft is equal to or less than the seventh value, where
the third alert signal is an alert signal other than the first alert signal and the second alert signal; and
providing the third alert signal to the crew alerting system.

24. The method of claim 23, further comprising:
receiving navigation data further representative of a vertical speed of the aircraft;
determining one eighth value as a function of the vertical speed of the aircraft and the phase of flight and flight attitude parameter, where
the eight value is representative of a first alert clearance altitude;
determining one ninth value as a function of the seventh value and the eighth value, where
the ninth value is representative of a first ascent alert altitude;
generating a fourth alert signal comprised of a fourth visual alert if the altitude of the aircraft is equal to or less than the ninth value, where
the fourth alert signal is an alert signal other than the first alert signal, the second alert signal, and the third alert signal; and
providing the fourth alert signal to the crew alerting system.

25. The method of claim 24, further comprising:
determining one tenth value as a function of the vertical speed of the aircraft and the phase of flight and flight attitude parameter, where
the tenth value is representative of a second alert clearance altitude;
determining one eleventh value as a function of the seventh value and the tenth value, where
the eleventh value is representative of a second ascent alert altitude;
generating a fifth alert signal comprised of a fifth visual alert if the altitude of the aircraft is equal to or less than the eleventh value, where
the fifth alert signal is an alert signal other than the first alert signal, the second alert signal, the third alert signal, and the fourth alert signal; and
providing the fifth alert signal to the crew alerting system.

26. A method for generating an alert signal in a terrain awareness and warning system of an aircraft, said method comprising:
receiving navigation data representative of the current position, projected flight path, altitude, attitude, and radio altitude of an aircraft in flight;
acquiring airport-related data representative of the nearest airport from the current position of the aircraft;
determining a phase of flight and flight attitude parameter as a function of the navigation data and the airport-related data;
determining one first value representative of a required terrain clearance altitude associated with the phase of flight and flight attitude parameter;
generating a first alert signal comprised of a first visual alert if the radio altitude of the aircraft is equal to or less than the first value only, where
the first visual alert is a visual indication regarding terrain directly under the aircraft only;
providing the first alert signal to a crew alerting system comprised of at least one display unit;
acquiring terrain data from the source of airport data based upon the projected flight path of the aircraft, where
the terrain data is representative of a plurality of second values, where
the plurality of second values is representative of elevations of terrain cells over which the aircraft is projected to operate and other than the terrain directly under the aircraft only;
determining a plurality of third values as a function of the first value and the plurality of second values, where
the plurality of third values is representative of a plurality of minimum operating altitudes of the terrain cells over which the aircraft is projected to operate and other than the terrain directly under the aircraft;
determining a fourth value as a function of the first value, where
the fourth value is representative of one minimum descent radio altitude;
generating a second alert signal comprised of a second visual alert if the radio altitude of the aircraft is equal to or less than the fourth value only, where
the second visual alert is a visual indication regarding terrain other than the terrain directly under the aircraft; and
providing the second alert signal to the crew alerting system, such that
the first visual alert is produced on a display unit when the first alert signal is received, and
the second visual alert is produced on a display unit when the second alert signal is received.

27. The method of claim 26, further comprising:
receiving navigation data further representative of the vertical speed of the aircraft;
determining one fifth value as a function of the vertical speed of the aircraft and the phase of flight and flight attitude parameter, where
the fifth value is representative of a first alert radio altitude;
generating a third alert signal comprised of a third visual alert if the radio altitude of the aircraft is equal to or less than the fifth value, where
the third alert signal is an alert signal other than the first alert signal and the second alert signal; and
providing the third alert signal to the crew alerting system.

28. The method of claim 27, further comprising:
determining one sixth value as a function of the vertical speed of the aircraft and the phase of flight and flight attitude parameter, where
the sixth value is representative of a second alert radio altitude;
generating a fourth alert signal comprised of a fourth visual alert if the radio altitude of the aircraft is equal to or less than the sixth value, where
the fourth alert signal is an alert signal other than the first alert signal, the second alert signal, and the third alert signal; and
providing the fourth alert signal to the crew alerting system.

29. A method for generating an alert signal in a terrain awareness and warning system of an aircraft, said method comprising:
receiving navigation data representative of the current position, projected flight path, altitude, and attitude of an aircraft in flight;
acquiring airport-related data representative of the nearest airport from the current position of the aircraft;
determining a phase of flight and flight attitude parameter as a function of the navigation data and the airport-related data;

acquiring first minimum operating altitude data and second minimum operating altitude data from a source of predefined, minimum operating altitude terrain cell data based upon the phase of flight and flight attitude parameter and the current position of the aircraft, where
the first minimum operating altitude data is representative of a first value per the phase of flight and flight attitude parameter, where
the first value is representative of one first predefined, minimum operating altitude of one terrain cell over which the aircraft is currently operating,
the second minimum operating altitude data is representative of a plurality of second values per the phase of flight and flight attitude parameter, where
the plurality of second values is representative of second predefined, minimum operating altitudes of terrain cells over which the aircraft is projected to operate and other than the one terrain cell over which the aircraft is currently operating;
generating a first alert signal comprised of a first visual alert if the altitude of the aircraft is equal to or less than the first value only, where
the first visual alert is a visual indication regarding the terrain over which the aircraft is currently operating only;
providing the first alert signal to a crew alerting system comprised of at least one display unit;
determining one third value as a function of the first value and the plurality of second values, where
the third value is representative of one minimum descent altitude;
generating a second alert signal comprised of a second visual alert if the altitude of the aircraft is equal to or less than the third value only, where
the second visual alert is a visual indication regarding terrain other than the terrain over which the aircraft is currently operating; and
providing the second alert signal to the crew alerting system, such that
the first visual alert is produced on a display unit when the first alert signal is received, and
the second visual alert is produced on a display unit when the second alert signal is received.

30. The method of claim 29, further comprising:
receiving navigation data further representative of a vertical speed of the aircraft;
determining one fourth value as a function of the vertical speed of the aircraft and the phase of flight and flight attitude parameter, where
the fourth value is representative of a first alert clearance altitude;
determining one fifth value as a function of the third value and the fourth value, where
the fifth value is representative of a first descent alert altitude;
generating a third alert signal comprised of a third visual alert if the altitude of the aircraft is equal to or less than the fifth value, where
the third alert signal is an alert signal other than the first alert signal and the second alert signal; and
providing the third alert signal to the crew alerting system.

31. The method of claim 30, further comprising:
determining one sixth value as a function of the vertical speed of the aircraft and the phase of flight and flight attitude parameter, where
the sixth value is representative of a second alert clearance altitude;
determining one seventh value as a function of the third value and the sixth value, where
the seventh value is representative of a second descent alert altitude;
generating a fourth alert signal comprised of a fourth visual alert if the altitude of the aircraft is equal to or less than the seventh value, where
the fourth alert signal is an alert signal other than the first alert signal, the second alert signal, and the third alert signal; and
providing the fourth alert signal to the crew alerting system.

32. The method of claim 29, further comprising:
receiving navigation data further representative of a speed of the aircraft;
determining one fourth value as a function of the third value, the plurality of fifth values, and variable climb gradient data only, where
the fourth value is representative of a minimum ascent altitude;
generating a third alert signal comprised of a third visual alert if the altitude of the aircraft is equal to or less than the fourth value, where
the third alert signal is an alert signal other than the first alert signal and the second alert signal; and
providing the third alert signal to the crew alerting system.

33. The method of claim 32, further comprising:
receiving navigation data further representative of a vertical speed of the aircraft;
determining one fifth value as a function of the vertical speed of the aircraft and the phase of flight and flight attitude parameter, where
the fifth value is representative of a first alert clearance altitude;
determining one sixth value as a function of the fourth value and the fifth value only, where
the sixth value is representative of a first ascent alert altitude;
generating a fourth alert signal comprised of a fourth visual alert if the value of the altitude of the aircraft is equal to or less than the sixth value, where
the fourth alert signal is an alert signal other than the first alert signal, the second alert signal, and the third alert signal; and
providing the fourth alert signal to the crew alerting system.

34. The method of claim 33, further comprising:
determining one seventh value as a function of the vertical speed of the aircraft and the phase of flight and flight attitude parameter, where
the seventh value is representative of a second alert clearance altitude;
determining one eighth value as a function of the fourth value and the seventh value, where
the eighth value is representative of a second ascent alert altitude;
generating a fifth alert signal comprised of a fifth visual alert if the altitude of the aircraft is equal to or less than the eighth value, where
the fifth alert signal is an alert signal other than the first alert signal, the second alert signal, the third alert signal, and the fourth alert signal; and
providing the fifth alert signal to the crew alerting system.

* * * * *